(12) United States Patent
Philipp

(10) Patent No.: US 10,097,522 B2
(45) Date of Patent: Oct. 9, 2018

(54) ENCRYPTED QUERY-BASED ACCESS TO DATA

(71) Applicant: Nili Philipp, Beit Shemesh (IL)

(72) Inventor: Nili Philipp, Beit Shemesh (IL)

(*) Notice: Subject to any disclaimer, the term of this patent is extended or adjusted under 35 U.S.C. 154(b) by 247 days.

(21) Appl. No.: 15/161,563

(22) Filed: May 23, 2016

(65) Prior Publication Data

US 2016/0344707 A1 Nov. 24, 2016

Related U.S. Application Data

(60) Provisional application No. 62/238,726, filed on Oct. 8, 2015, provisional application No. 62/164,566, filed on May 21, 2015.

(51) Int. Cl.
*H04L 29/06* (2006.01)
*G06F 21/62* (2013.01)
(Continued)

(52) U.S. Cl.
CPC ...... *H04L 63/0435* (2013.01); *G06F 21/6227* (2013.01); *H04L 9/0894* (2013.01); *H04L 63/06* (2013.01); *H04L 67/1097* (2013.01)

(58) Field of Classification Search
None
See application file for complete search history.

(56) References Cited

U.S. PATENT DOCUMENTS 6,363,481 B1 * 3/2002 Hardjono ............... H04L 9/085
713/165
7,945,784 B1 * 5/2011 Masinter ............... H04L 9/085
380/28
(Continued)

OTHER PUBLICATIONS

Jun Yang, Chuan Fu, Nan Shen, Zheli Liu, Chunfu Jia, Jin Li, "General Multi-Key Searchable Encryption", 29th International Conference on Advanced Information Networking and Applications Workshops, 2015.*

(Continued)

*Primary Examiner* — Morshed Mehedi
*Assistant Examiner* — Vadim Savenkov
(74) *Attorney, Agent, or Firm* — Alphapatent Associates, Ltd; Daniel J. Swirsky

(57) ABSTRACT

A query-based system for sharing encrypted data, comprising at least one hardware processor; and at least one non-transitory memory device having embodied thereon instructions executable by the at least one hardware processor to: receive a file and a plaintext tag and provide secure access to the file using the plaintext tag, and, responsive to receiving a search query matching the plaintext tag, securely retrieve the file, wherein providing secure access to the file comprises: encrypting the file into multiple portions, storing each portion separately, deriving multiple differently encrypted ciphertexts by encrypting the plaintext tag multiple times, separately indexing each portion using a different one of the ciphertexts, wherein securely retrieving the file comprises: deriving multiple differently encrypted search queries by encrypting the search query multiple times, querying using the multiple encrypted search queries, retrieving at least some of the multiple portions, and recovering the file from the retrieved portions.

7 Claims, 14 Drawing Sheets

(51) Int. Cl.
*H04L 29/08* (2006.01)
*H04L 9/08* (2006.01)

(56) References Cited

U.S. PATENT DOCUMENTS

| | | | |
|---|---|---|---|
| 8,271,974 | B2 | 9/2012 | Mazhar |
| 8,572,757 | B1 | 10/2013 | Stamos et al. |
| 8,738,683 | B2 | 5/2014 | Matzkel |
| 8,964,988 | B2* | 2/2015 | Nishimaki ............ H04L 9/0836 380/278 |
| 9,135,454 | B2* | 9/2015 | Shikfa ................ G06F 21/6227 |
| 9,715,546 | B1* | 7/2017 | Mohassel .......... G06F 17/30864 |
| 9,740,879 | B2* | 8/2017 | Hahn ................. G06F 21/6227 |
| 2010/0169391 | A1* | 7/2010 | Baptist ............. G06F 17/30126 707/827 |
| 2013/0287206 | A1* | 10/2013 | Hattori .................. H04L 9/0836 380/30 |
| 2014/0101221 | A1* | 4/2014 | Alnafoosi ............... H04L 67/10 709/201 |
| 2014/0173270 | A1 | 6/2014 | Matsuo |
| 2014/0189352 | A1 | 7/2014 | Baskaran |
| 2014/0201541 | A1* | 7/2014 | Paul ..................... G06F 21/6245 713/193 |
| 2014/0222753 | A1* | 8/2014 | Gladwin ........... G06F 17/30345 707/609 |
| 2015/0302218 | A1* | 10/2015 | Fielder ................. G06F 19/322 713/193 |
| 2018/0012028 | A1* | 1/2018 | Barbas ................. G06F 21/602 |
| 2018/0039792 | A1* | 2/2018 | Ohara ................. G06F 21/6227 |

OTHER PUBLICATIONS

Divya G Nair, Binu V.P., G. Santhosh Kumar "An Effective Private Data storage and Retrieval System using Secret sharing scheme based on Secure Multi-party Computation" 2014 International Conference on Data Science & Engineering (ICDSE) DOI: 10.1109/ICDSE.2014.6974639.

T. Radhika, S.Vasumathi Kannagi "Secure Sharing and Access Control of Personal Health Record in cloud Computing" International Journal of Innovative Research in Computer and Communication Engineering vol. 2, Special Issue 3, Jul. 2014.

Nesrine Kaaniche, Aymen Boudguiga, Maryline Laurent "ID-Based Cryptography for Secure Cloud Data Storage" Cloud 2013: IEEE 6th International Conference on Cloud Computing, Jun. 2013, Santa Clara, CA, United States. IEEE, Proceedings Cloud 2013 : IEEE 6th International Conference on Cloud Computing, pp. 375-382, 2013, <10.1109/CLOUD.2013.80>.

Chang Liu, Liehuang Zhu, Jinjun Chen "Efficient Searchable Symmetric Encryption for Storing Multiple Source Data on Cloud" Trustcom/BigDataSE/ISPA, 2015 IEEE DOI: 10.1109/Trustcom. 2015.406.

Eike Kiltz "Chosen-ciphertext security from tag-based encryption." Theory of Cryptography Conference. Springer Berlin Heidelberg, 2006.

Dana Thilakanathan, Shiping Chen, Surya Nepal, Raraeli A. Calvo "Secure data sharing in the Cloud." Security, Privacy and Trust in Cloud Systems. Springer Berlin Heidelberg, 2014. 45-72.

Dan Boneh, Craig Gentry, Shai Halevi, Frank Wang, David J. Wu "Private database queries using somewhat homomorphic encryption." International Conference on Applied Cryptography and Network Security. Springer Berlin Heidelberg, 2013.

Mujammad Naveed, Manoj Prabhakaran, Carl A. Gunter "Dynamic searchable encryption via blind storage." 2014 IEEE Symposium on Security and Privacy. IEEE, 2014.

D.Pratiba, Dr.G.Shobha, Vijaya Lakshmi .P.S. Efficient Data Retrieval From Cloud Storage Using Data Mining Technique International Journal on Cybernetics & Informatics (IJCI) vol. 4, No. 2, Apr. 2015.

Hongwei Li, Dongxiao Liu, Yuanshun Dai, Tom H. Luan, Xuemin (Sherman) Shen Enabling Efficient Multi-Keyword Ranked Search Over Encrypted Mobile Cloud Data Through Blind Storage IEEE Transactions on Emerging Topics in Computing Date of publication Dec. 11, 2014; date of current version Mar. 6, 2015.

Stephen R. Tate Roopa Vishwanathan, Scott Weeks "Encrypted secret sharing and analysis by plaintext randomization." Information Security. Springer International Publishing, 2015. 49-65.

A.R.Zade, Shaikh Umar, Potghan Rahul, Rale Sagar , Borade Sagar Improving Cloud Data Storage Using Data Partition and Recovery International Journal of Engineering and Computer Science ISSN:2319-7242 vol. 4 Issue 1 Jan. 2015, p. No. 10144-10249.

MD Iftekhar Salamn, Wei-Chuen Yau, Ji-Jian Chin, Swee-Huay Heng, Huo-Chong Ling, Raphael C-W Phan, Geong Sen Poh, Syh-Yuan Tan, Wun-She Yap Implementation of searchable symmetric encryption for privacy-preserving keyword search on cloud storage Salam et al. Human Centric Computing and Information Sciences (2015) 5:19 DOI 10.1186/s13673-015-0039-9.

Reza Curtmola, Juan Garay , Seny Kamara , Rafail Ostrovsky "Searchable symmetric encryption: improved definitions and efficient constructions." Journal of Computer Security 19.5 (2011): 895-934.

\* cited by examiner

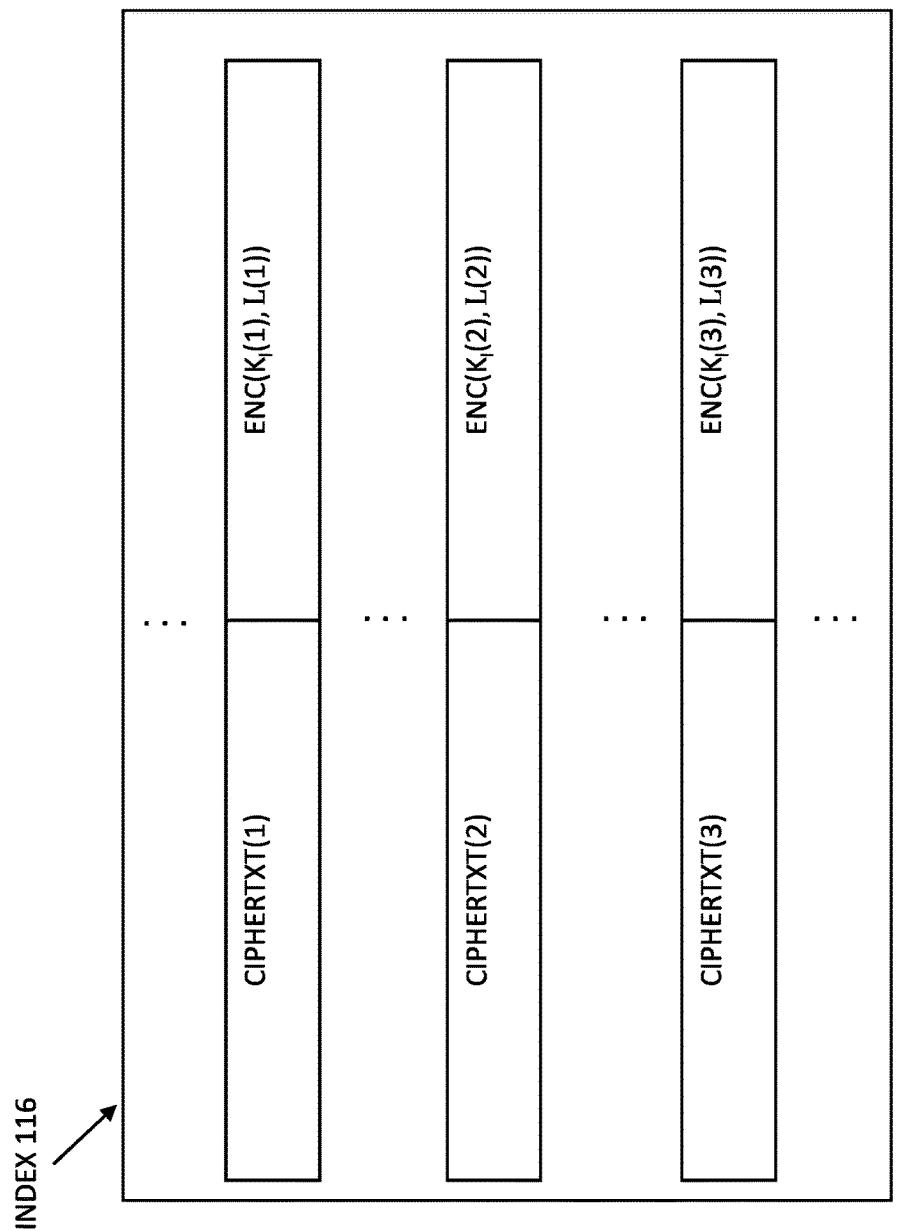

FIG. 2B

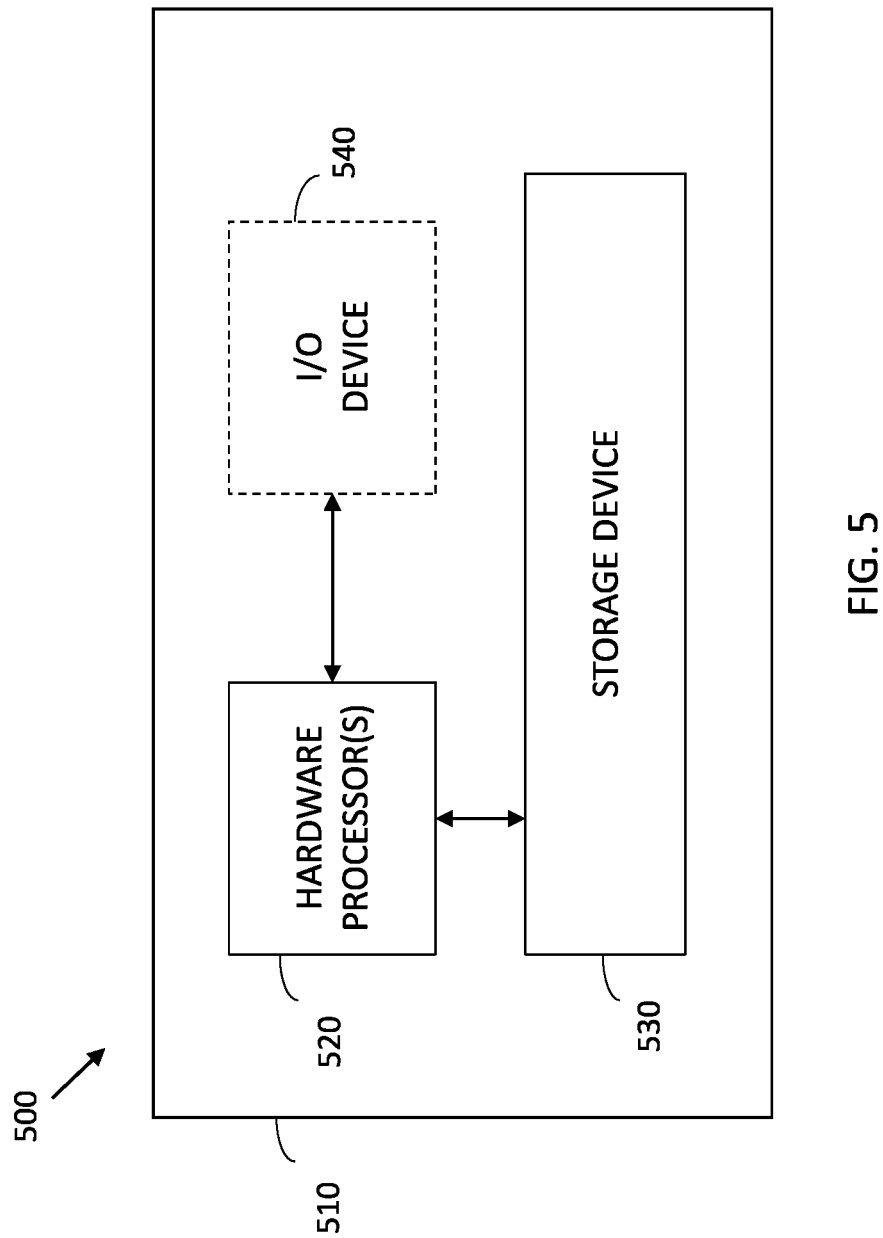

ENCRYPTED QUERY-BASED ACCESS TO DATA

CROSS-REFERENCE TO RELATED APPLICATIONS

This application claims the benefit of priority of U.S. Provisional Patent Application No. 62/164,566, filed May 21, 2015, and entitled "Authorized Cloud-Based Access to Data", the contents of which are incorporated herein by reference in their entirety, and of U.S. Provisional Patent Application No. 62/238,726, filed Oct. 8, 2015, and entitled "Authorized Access to Data over a Network", the contents of which are incorporated herein by reference in their entirety.

BACKGROUND

This invention relates to data security.

The ability to share data over the cloud or Internet has allowed users to collaborate and communicate in a manner that could not have been contemplated until very recently. The convenience of sharing data has made state-of-the-art data distribution and sharing services indispensable in many scenarios ranging from media, business, education, government, social applications and more. Today, anyone with a handheld mobile phone can instantly share their vacation photos with distant friends and family. Coworkers separated by thousands of kilometers can simultaneously edit the same file, and schools can upload the latest edition of a textbook and make a single digital copy available to hundreds of students, saving printing and paper costs.

However, together with the benefits of sharing information is the downside of a loss to privacy. Data stored publicly on the 'cloud' is vulnerable to intrusions, hackers, and espionage, exposing users to privacy violations, blackmail, and threats that were never imaginable in the past. Moreover, the interconnectedness facilitated by the Internet has greatly exacerbated the damage caused by privacy breaches by enabling leaked information to spread in mere seconds to millions of people across the world.

This has come to public attention over the last few years as children having come of age with the Internet discover that their adolescence has left digital footprints for college admissions staff and potential employers to scrutinize. Recent highly publicized scandals have spotlighted the growing problem of intrusions into data storage platforms and the resulting exposure of private data.

When data sharing over the cloud was first implemented, a common defense to counter privacy concerns was that the sheer quantity of available data protected users from having their data divulged; the pile of data was so deep, it would be impossible to mine any individual's personal information. However, this argument failed to account for the fact that data stored on the cloud is tagged and indexed. Rather than a random heap, the data is highly mapped and networked, and therefore accessible using simple search techniques.

Some social media platforms try to overcome these issues by allowing users to create closed or private circles of 'friends' for sharing data. However, this requires all the interacting friends to join that particular social media platform, something they are not always willing to do. Furthermore, users' privacy is at the mercy of any given platform's security measures, and as these platforms become bigger and draw more users, their attraction increases as targets for attacks.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a query-based system for sharing encrypted data, comprising: a first client; a second client; a storage device; an index; and a network, wherein each of the first and second clients are configured to communicate with the storage device and the index via the network, wherein the first client is configured to receive a file and a plaintext tag and provide the second client with secure access to the file via the network using the plaintext tag, and wherein the second client is configured to receive a search query comprising the plaintext tag, and use the search query to securely retrieve the file via the network, wherein the first client is configured to provide the second client with secure access to the file by: encrypting the file into multiple encrypted portions, separately storing each encrypted portion at the storage device, deriving multiple ciphertexts by encrypting the plaintext tag using multiple different encryption keys, and separately indexing at the index each stored encrypted portion with a different one of the ciphertexts, and wherein the second client is configured to securely retrieve the file by deriving multiple encrypted search queries comprising the multiple ciphertexts by encrypting the search query using the multiple different encryption keys, separately submitting the multiple encrypted search queries to the index, separately retrieving the multiple encrypted portions from the storage device, and recovering the file from the multiple encrypted portions.

In some embodiments, the first client is configured to derive each ciphertext using a symmetric encryption algorithm and a unique combination of the encryption keys, and wherein separately indexing each stored encrypted portion comprises storing the different one of the ciphertexts with an encrypted storage location string of the stored encrypted portion, wherein the encrypted storage location string is derived using the symmetric encryption algorithm with the unique combination of the encryption keys, and wherein retrieving the multiple encrypted portions comprises, for each encrypted search query, retrieving the encrypted locator string of the portion, decrypting the encrypted locator string using the unique combination of the encryption keys used to derive the encrypted search query, and retrieving the encrypted file portion from the storage device using the decrypted locator string.

In some embodiments, the first client is configured to encrypt the file using an asymmetric encryption scheme, and wherein the second client is configured to recover the file using an asymmetric decryption scheme.

In some embodiments, the first client is further configured to provide the second client with the multiple different encryption keys.

In some embodiments, the first client is further configured to derive the multiple different encryption keys from a first key derivation function using a seed.

In some embodiments, the second client is further configured to derive the multiple different encryption keys from a second key derivation function using the seed.

In some embodiments, the first client is further configured to provide the second client with the seed over a channel that is independent of the network.

In some embodiments, the seed comprises the plaintext tag.

In some embodiments, the first client is configured to encrypt the file by applying a (q,n) threshold secret-sharing scheme wherein n is the number of stored encrypted portions and wherein q are the number of portions required to recover the file, and wherein the second client is configured to separately submit q separate encrypted search queries, and separately retrieve q encrypted portions.

In some embodiments, the first client is configured to provide the second client with a number m, wherein m is the number of portions required to recover the file, and wherein the second client is configured to encrypt the search query into m different encrypted search queries, separately submit the m encrypted search queries, and separately retrieve m encrypted portions.

In some embodiments, the number of multiple encryption keys u is fewer than the number of stored encrypted portions n.

In some embodiments, any of: n and u is determined according to the relationship $n \leq 2^u - 1$, and wherein any of: deriving the multiple different ciphertexts and deriving the multiple encrypted search queries comprises, for each ciphertext and each encrypted search query, encrypting the plaintext v times using a different one of the $2^u - 1$ non-null combinations of the u encryption keys, wherein v is the cardinality of the combination.

In some embodiments, any of n and u are selected in accordance with a constraint imposed on the cardinalities of the combinations.

In some embodiments, the constraint comprises imposing a uniform distribution on the cardinalities.

In some embodiments, for each ciphertext, the first client is configured to encrypt the plaintext tag using a different one of multiple combinations of the encryption keys, and sort the encrypted file portions according to the combinations, and wherein for each encrypted search query, the second client is configured to encrypt the search query using the different one of the multiple combinations, and sort the retrieved portions according to the multiple combinations.

In some embodiments, the multiple combinations are determined according to the prime factors of the number of the stored encrypted portions, and wherein the number of the multiple encryption keys corresponds to the sum of the prime factors.

In some embodiments, the first client is further configured to separately index by indexing at multiple different indexes, and the second client is further configured to separately submit the multiple encrypted search queries by distributing the submissions over the multiple different indexes.

In some embodiments, the first client is instantiated on a first computing device and wherein the second client is instantiated on a second computing device.

In some embodiments, the first client is further configured to provide the second client with secure access to multiple files using the plaintext tag, and wherein the second client is further configured to securely retrieve the multiple files using the plaintext tag, wherein the multiple encrypted stored portions of the multiple files do not include any common identifying information.

In some embodiments, the file comprises a set of parameters associated with a device operative with the Internet of Things (IoT).

In addition to the exemplary aspects and embodiments described above, further aspects and embodiments will become apparent by reference to the figures and by study of the following detailed description.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below:

FIGS. 1A-1G, taken together, show a system for sharing data, in accordance with an embodiment;

FIGS. 2A-2B illustrate a system for providing authorized access to data, in accordance with another embodiment;

FIG. 5 shows an exemplary system for executing any of the methods described herein.

DETAILED DESCRIPTION

This invention applies a variation of a searchable symmetric encryption (SSE) scheme to access a file fragmented into multiple portions. Computation capacity has improved considerably such that merely encrypting a file does not necessarily provide protection from hackers. To address this, an encrypted file may be fragmented into multiple encrypted portions which are each stored separately. The portions may be created using any known technique, such as by partitioning an encrypted file into multiple fragments or 'portions', or by using a secure-threshold secret sharing algorithm. Since the portions cannot be used individually to recover the file without additional portions, scattering the portions may provide an additional security measure.

Figure 1A:
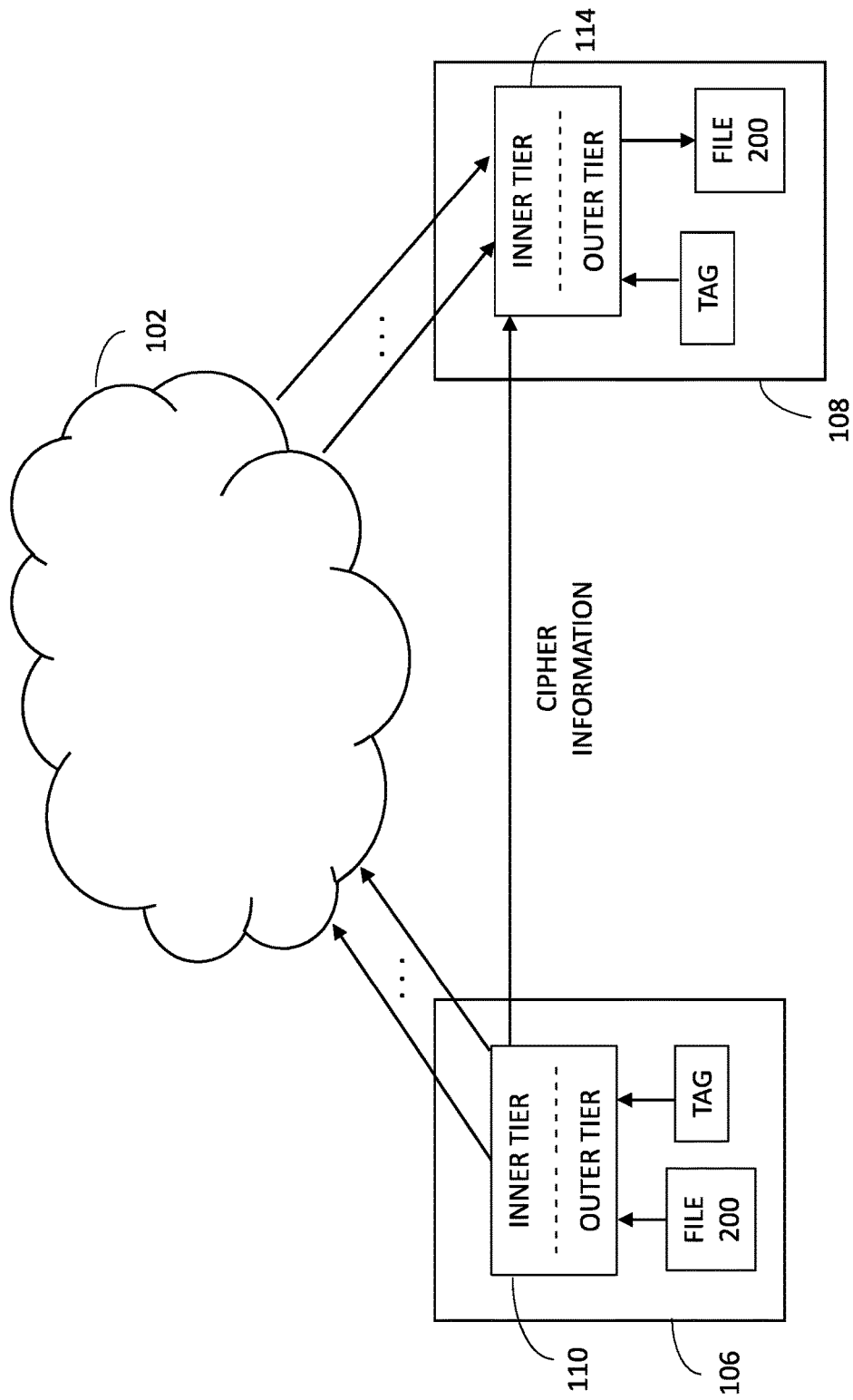

This invention proposes a method to retrieve statically stored data as fragmented and scattered portions via query. A two-tiered query-based method to share data is proposed: an outer plaintext tier, and an inner encrypted tier. The outer tier interfaces with the users, and provides an interface in keeping with conventional file sharing methods, allowing users to 'tag' a file with a plaintext term, 'select' a contact with whom to share the file, 'upload' the file, and subsequently 'query' for the plaintext tag to retrieve the file. Any of the many known graphical user interfaces (GUIs) that provide such services may be implemented for the outer tiers of the uploading client and receiving client applications. The inner tier interfaces with the network, storage device and index, such that the data flowing therebetween is both encrypted and fragmented. A conceptual diagram of the outer and inner tiers configured with an uploading client 110 and a receiving client 114 is shown in FIG. 1A.

The uploading client's outer tier receives from the user a file and a plaintext tag and provides them to the uploading client's inner tier, which encrypts and fragments the received data before uploading them to a platform where they can be accessed by the receiving client. The receiving client's outer tier receives a plaintext search query and provides it to the receiving client's inner tier, which uses the search query to retrieve the encrypted and fragmented data. The receiving client's inner tier then recovers the file from the fragmented data and provides it to the user via the outer tier. The users may be blind to the workings of the inner tier, allowing them to enjoy the familiar and intuitive user experience of the outer tier, which may be implemented using any of the many conventional file-sharing interfaces. This invention primarily describes several implementations for the inner tier.

The uploading client's inner tier encrypts and fragments the file, received from the outer tier, into portions. Additionally, the plaintext tag is encrypted multiple times using different keys to generate multiple different encrypted ciphertexts, or 'signatures', one for indexing each of the encrypted file portions. The encrypted file portions are uploaded over a network onto a storage device, and each portion is separately indexed according to one of the ciphertexts. Thus, from the perspective of the network, storage device and indexing service, the uploaded data appear as multiple, independent, and separately indexed files. Since both the file portions and the indexing terms are encrypted, the data uploaded by the uploading client do not include information that can indicate that the portions belong together or are associated with the same file, nor that the indexing terms belong together and are associated with the same file. This makes it hard for an unauthorized user to guess which portions and/or index terms are needed to recover the file. When many such files are fragmented and indexed, the problem of determining which portions belong to what file can become significantly more complex.

To retrieve the data, the receiving client's inner tier encrypts the plaintext search query 'tag', received from the outer tier, multiple times using the same keys as above, to generate the ciphertext indexing terms. These are submitted as multiple, independent search queries. The encrypted file portions are retrieved as multiple separate files, and recombined to recover the file, which is then provided to the user via the outer tier. Here too, from the perspective of the network, storage device and index, the queried data appear as multiple, independent, and separately indexed files.

Thus users interfacing with the outer tier handle plaintext tags and unencrypted files, making the system familiar and intuitive. The inner tier, interfacing with the network, storage and indexing services, handles encrypted and fragmented data, making the data hard to both discover and recover for a non-authorized agent.

Encryption in this system serves several functions in addition to merely encrypting the file: 1) it is used to encode the plaintext to generate multiple ciphertext indexing terms for the file portions; 2) since the indexing terms are generated via encryption, guessing the correct combination of indexing terms belonging to any one file is difficult; 3) since the ciphertext indexing terms are generated from a single plaintext, authorized users can easily derive them using familiar 'tag' and 'query' steps; and 4) the keys themselves may be used to position the retrieved file portions in order to recover the file.

This last function works as follows: to upload, the uploading client maps the encrypted file portions into the cells of an array, and assigns keys to index the cells of the array (i.e. row keys and column keys), such that a unique combination of keys indexes each cell. The indexing term used to index a portion is derived using the portion's unique combination of keys, by encrypting the plaintext multiple times using each key of the combination (i.e. encrypting twice using a row key and a column key). The receiving client does the same but in reverse: it creates an empty array with the same keys indexing the cells, as above. The search queries are derived the same way the indexing ciphertexts were derived by the uploading client: the search query for retrieving each portion is derived by encrypting the plaintext using the unique combination of keys (row, column) for the cells of the array. The retrieved portion is then inserted into the cell indexed by that unique combination of keys. Once the array is filled, the portions can be combined according to their order defined by the array to construct the encrypted file, which can then be decrypted.

Thus, in addition to the encryption, the factorization of n, corresponding to the dimensions of the array, may be used to encode and decode the data. The dimensions of the array may correspond to the prime factors of the number of file portions n. There are several advantages to this: a) the set of prime factors for n is unique and thus for a given n, both the uploading and receiving clients can create the same array, b) the sum of the prime factors is the minimum sum of the factors of n. Since the number of keys required corresponds to the dimensions of the array, using the prime factors requires a minimal number of keys.

This two-tiered method may provide a convenient framework for the authorized users to tag and access their data using contextual plain-text terms via the outer tier, with the added security of storing their data in an encrypted, fragmented and scattered form, via the inner tier.

While stored, the encrypted file portions may appear as generic blocks of encrypted data that do not disclose any information regarding the file to which they belong, nor to the other portions belonging to the same file. Additionally, the portions do not disclose the identity of the file's users. For example, the portions may have a uniform format and/or size. Furthermore, the portions cannot be decrypted on their own, and need to be combined first with other portions belonging to the same file. Thus, a hacker intruding into a database storing numerous such portions of numerous files may be faced with a considerable task of determining which portions belong to which file before attempting to decrypt any of the data. Additionally, or alternatively, some of the portions may be stored at different storage devices, further complicating the task of locating the portions required to recover any given file.

A centralized encrypted index may provide access to the portions, and may list the ciphertext index terms together with the encrypted storage locations of the portions as encrypted pairs. The encrypted index may store numerous such pairs for numerous files. Each encrypted pair may appear as a generic index entry, similar in format and/or length to the other encrypted pairs stored in the index, without disclosing any information regarding the file to which it belongs, nor to any of the other encrypted pairs that index any of the portions belonging to the same file. Thus a hacker searching through such an index may be faced with a considerable task of determining which pairs belong to any given file. Furthermore, each encrypted pair is encrypted using different key(s), thus even should a hacker succeed in identifying pairs belonging to the same file, decrypting them to access the portions may prove a further challenge. The index may store a sufficient number of pairs to make the task of guessing the set of pairs that index a given file difficult. Furthermore, each file may be divided into a different number of portions, and thus the number of index entry pairs for the different files may vary, presenting another unknown variable to an intruder—not only does he need to know which blocks and/or indexing pairs to use in order to recover a file, he needs to know how many.

By contrast, the authorized user possessing the keys and the plaintext tag can easily derive the ciphertext index terms and query the index to gain access to the portions for recovering the file. A symmetric encryption scheme may be used to encrypt the pairs in the index, such that the key(s)

used to derive the search queries may be used to decrypt the storage location returned in response to the query. The encrypted file portion may then be accessed using the decrypted locator. The encryption algorithm for encrypting the file may be independent of the encryption algorithm for encrypting the plaintext, and thus may be any suitable encryption algorithm: symmetric or asymmetric.

Although portions of encrypted data are routinely exchanged via network packets there are several important differences between network packets and the indexed, encrypted file portions described above: the encrypted portions are indexed and stored statically, and thus are accessible via query by any number of authorized users for any number of queries over time. The encrypted file portions can be updated without requiring them to be reindexed, and a subsequent query will return the updated data. Additional files can be added and similarly fragmented, indexed and stored, such that a query can return multiple files. In contrast, network-packets are generated 'on the fly' for each instance of a file transmission, and not stored statically nor are they indexed—the client does not submit individual queries for network-packets, rather a queried file is returned packetized. Furthermore, network-packets include a source and destination address, whereas the encrypted portions reveal no information about their origin or destination, neither do they reveal information that may allow associating different portions. This is an important distinction for maintaining privacy.

Similarly, storage devices routinely partition blocks of encrypted data and store them separately. However the storage device maintains a map to link those blocks together such that they may be recombined. In contrast, the present invention discloses a method for storing the blocks such that the storage device does not know which blocks belong together, nor how many blocks belong to any given file. This provides an additional security measure should an intruder break into the storage device in an attempt to recover the files stored therein.

The term 'plain-text tag' refers to a sequence of characters having a contextual connotation that may be associated with a file, or a user thereof, or device, application, or situation relating to any of the file, the users, and use of the file.

The term 'ciphertext' refers to an encoded or encrypted version of a plain-text term, and that, as a result of the encryption, does not have a contextual association with the file or with a user of the file. A ciphertext may be derived from a plain-text term using any known encryption, hashing, or other encoding technique as are known in the art.

The term 'file' as referred to herein is understood to be an electronic document comprising a set of data. Thus a file may be of any size, such as ranging from as small as a single byte of memory, i.e. to indicate a setting for a device, to one or more megabytes, such as for storing multimedia files.

The term 'client' as referred to herein is understood to be a set of processing instructions (computer program) implemented in hardware and/or software that integrates and communicates with another computer program.

Reference is now made to FIGS. 1A-1G which, taken together, show a system for sharing a data set, in accordance with an embodiment. Referring to FIG. 1A, a data sharing application includes a first client 110 configured with a first client device 106 and a second client 114 configured with a second client device 108. Client 110 provides client 114 with secure access to encrypted data over a network 102 responsive to client 114 submitting a plain-text search query. Network 102 may be any private or public network, such as a local area network, or the Internet. Devices 106 and 108 may be any type of computing device configured to communicate via wired and/or wireless means over network 102, and may be computers, tablets, mobile phones, and devices associated with the Internet of Things (IoT), to name a few. Although for the purpose of the description, clients 110 and 114 are shown implemented on separate devices, it is to be understood that any of devices 106 and 108 may be configured with both of clients 110 and 114 combined into one client application. In addition to communicating with network 102, devices 106 and 108 may communicate with each other independently of network 102, such as via a phone-based messaging system, local area network, Wi-Fi, Bluetooth, or wired means such as cables and the like. Additionally, although the invention is described with respect to storing and accessing data over a network, this is not meant to be limiting, and the method may be used to store and access data stored locally.

Clients 110 and 114 may each be configured with an outer tier 'plaintext' interface, and an inner tier 'encrypted' layer. The inner tiers of clients 110 and 114 may be provided with compatible encryption algorithms that, in response to receiving the same plain text, encryption keys and/or seeds, produce the same encrypted text. At least one of the encryption algorithms configured with clients 110 and 114 is symmetric, allowing the use of the same key for encrypting and decrypting data. Clients 110 and 114 may each be configured with compatible key derivation functions that produce matching encryptions keys responsive to supplying the same seed or passphrase. Examples of key derivation functions include random or pseudo-random number generators. The seed or passphrase may be sent securely from client 110 to client 114 and used accordingly to generate any of the encryption keys required to retrieve and/or recover encrypted data.

Figure 1B:
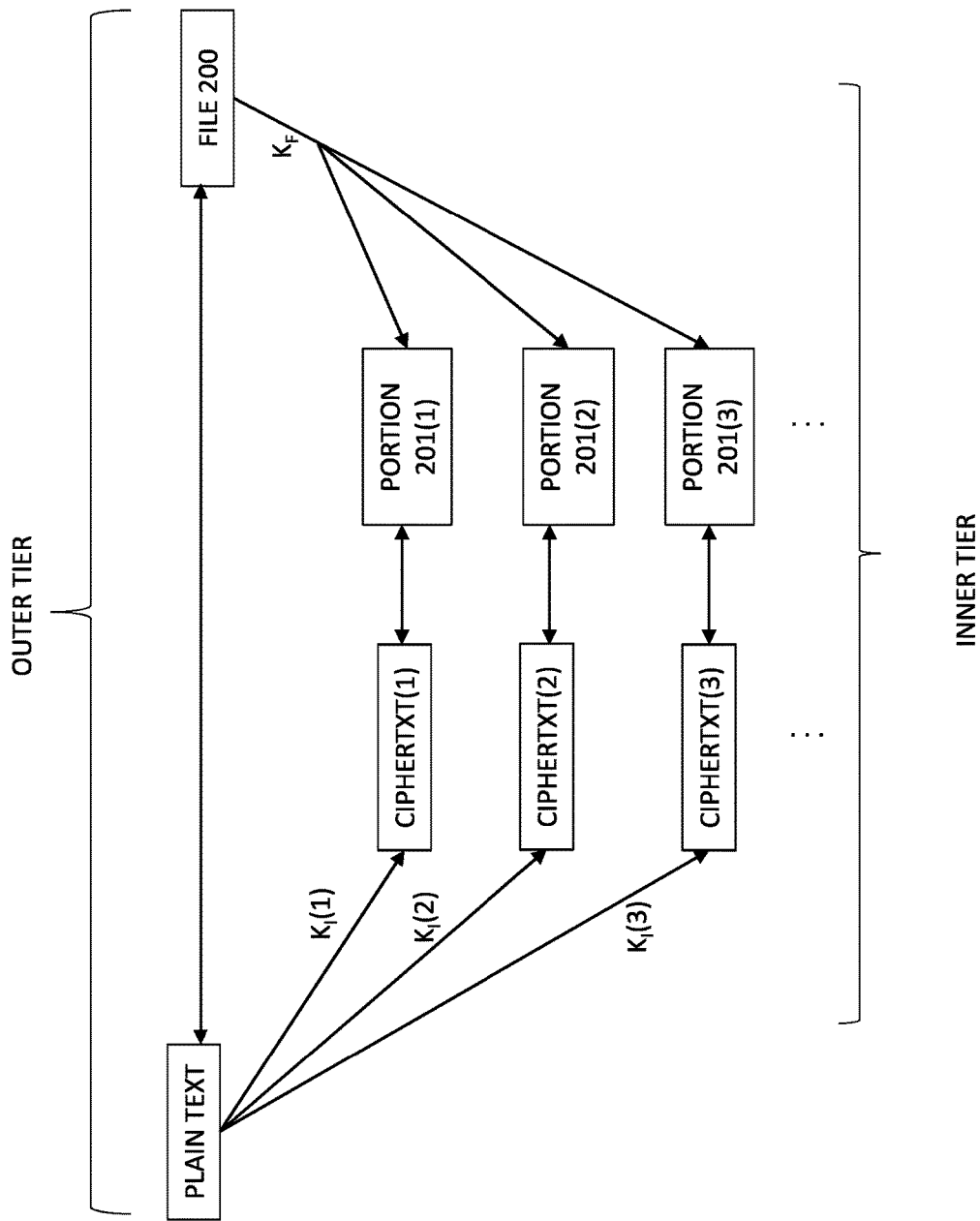

Referring to FIG. 1B, a conceptual diagram of the steps performed by client 110 for sharing the data with client 114 is shown.

Client 110 receives a file 200 and at least one plain-text term, or 'tag' of file 200 via the outer tier and provides them to the inner tier. For example, the outer tier may present a GUI allowing the user of device 106 to tag file 200 with the plain-text term. Alternatively, the tagging may be automatic via a software application that identifies one or more tokens in file 200 and submits the tokens as tags to client 110. The plain-text tag may be contextually relevant to any file 200, devices 106 and 108, and/or any of the users of devices 106 and 108, allowing file 200 to be shared using a contextually relevant tag via the outer tiers of clients 110 and 114. Optionally, the passphrase for generating the encryption keys may be the tag, or variation thereof.

Henceforth, the inner tier of client 110 encrypted, divides, indexes and stores the encrypted file data, as follows. Client 110 encrypts file 200 into n portions 201(i) using a file encryption key $K_F$ and encryption algorithm $ENC_F$, where n is any positive integer greater than 1, and $i \in \{1 \ldots n\}$ is used as an index to reference any of the n encrypted portions. The index term i, as used herein, is understood to index corresponding elements within different sets of n elements, for example for two sets A and B having n elements, A(i) and B(i) are understood to mean the $i^{th}$ element of A and the $i^{th}$ element of B. File 200 may comprise any data type and/or form, such as text, image, multi-media, formatted (spreadsheet, database), parameters associated with a file sharing platform, the IoT, text message, email, and the like.

Optionally, the encrypted file portions are shares derived using a secure secret sharing scheme. For example, encrypted file 200 is divided by client 110 in accordance with a secure (q,n)-threshold secret sharing technique, where q is the minimal number of encrypted portions that need to be retrieved in order to recover file 200. Examples of such algorithms include Shamir's scheme, Rabin's IDA scheme, use of the Chinese Remainder theorem, to name a few. Alternatively, file 200 may be encrypted using any suitable technique, symmetric or asymmetric, and partitioned into n portions such that the size of each portion is approximately 1/n times the size of the encrypted file 200.

Client 110 obtains multiple different index encryption keys $K_I(n)$. The index encryption keys $K_I(n)$ and optionally the file encryption key $K_F$ may be generated from the key derivation function using the passphrase or random seed. Optionally, file 200 is encrypted using an asymmetric scheme using a public/private key pair, and thus, client 114 may obtain the decryption key from a memory of device 108.

Client 110 encrypts the plain-text tag n different times using a symmetric encryption algorithm $ENC_I$ and multiple encryption keys $K_I$ (n) to derive n differently encrypted ciphertexts, CipherTxT(n), shown as an example in FIG. 1B as CipherTxT(1), CipherTxT(2), and CipherTxT(3) for n=3, each of which is used to index a different one of encrypted file portions 201(n). Examples of symmetric encryption algorithms include exclusive-or (XOR), Advanced Encryption Standard (AES), Twofish, Serpent, Blowfish, CAST5, Grasshopper, RC4, 3DES, Skipjack, to name a few.

Figure 1C:
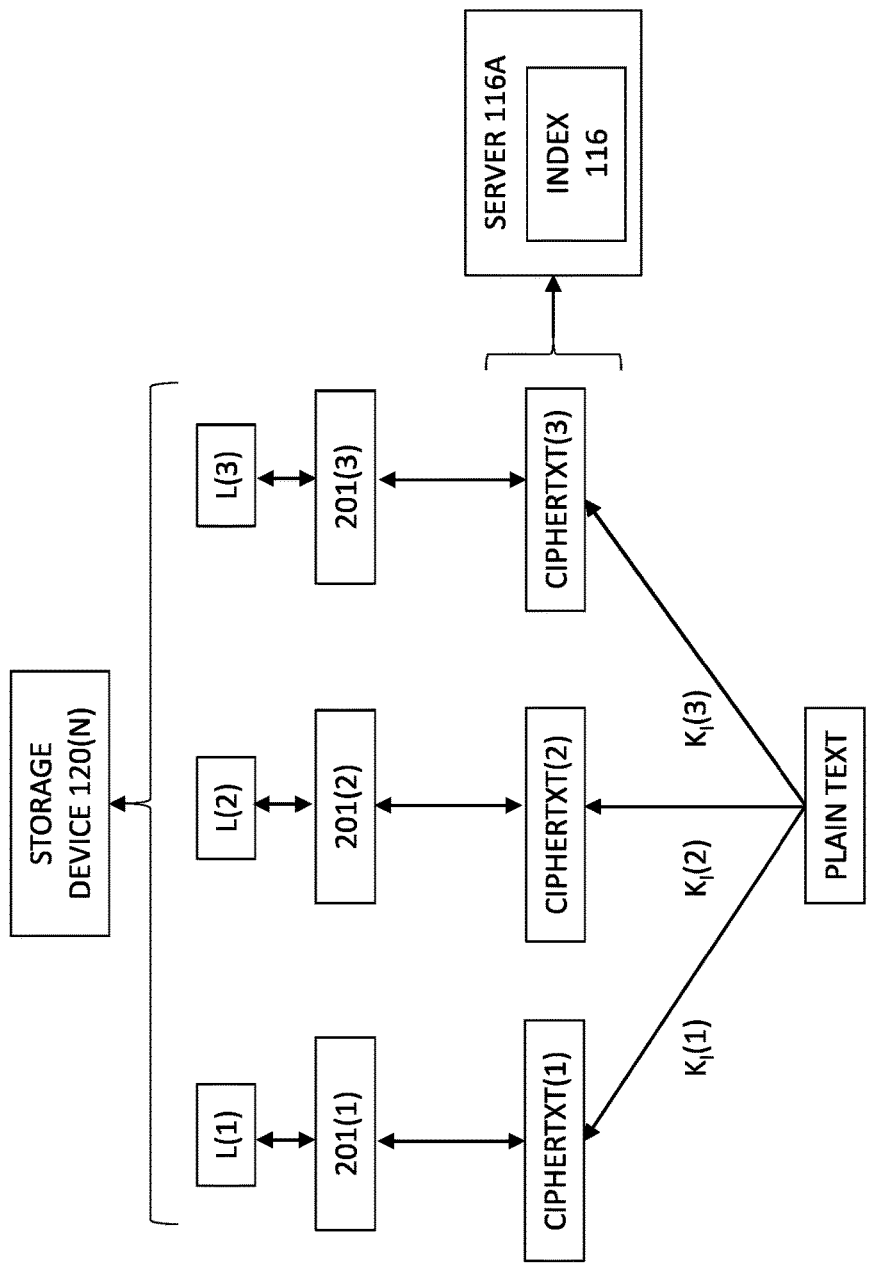

Referring to FIG. 1C, each portion 201(i) is associated with one of the ciphertexts and its encryption key $K_I(i)$. For example, referring to FIG. 1C, portion 201(1) is associated with CipherTxT(1) and key $K_I(1)$; and portions 201(2) and 201(3) are associated with CipherTxT(2) and keys $K_I(2)$; and CipherTxT(3) and $K_I(3)$, respectively.

Figure 1D:
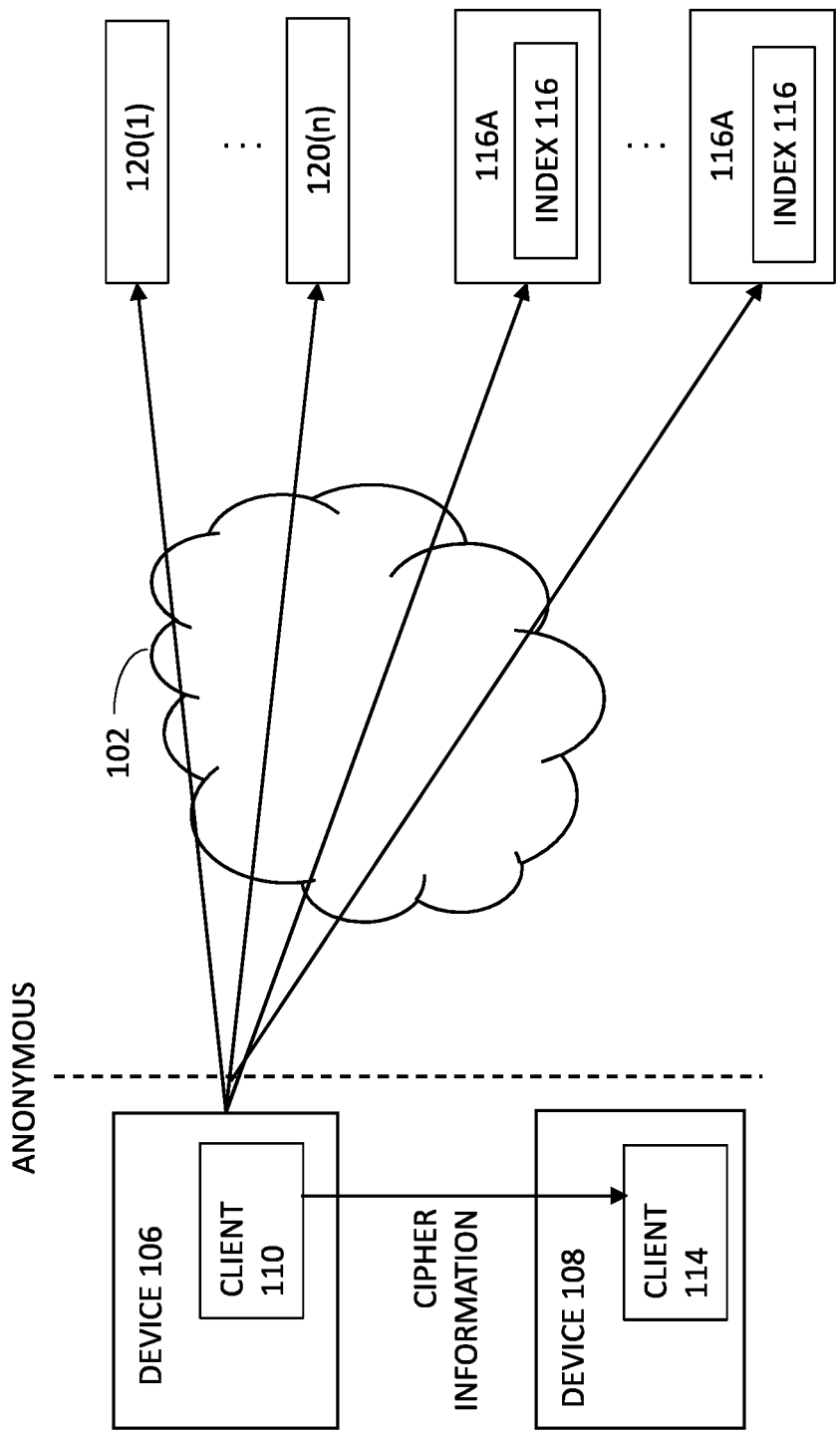

Referring to FIGS. 1C-1D, each of the n encrypted file portions 201(i) may be stored at a different storage location corresponding to a locator string L(i) at one or more (up to n) storage devices 120(i), such as may be provided by a cloud storage service, Internet service provider, local disk, or any other suitable storage medium. Optionally, client 110 may submit file portions 201(n) over network 102 for storage at devices 120(n). Locator strings L(n) may be any suitably storage location identifier that allows subsequently locating and retrieving file portions 201(n) from storage devices 120(n), and may include any suitable storage addresses, including but not limited to uniform resource locators (URLs), uniform resource identifier (URIs), Internet Protocol (IP) addresses, database or local storage address, and the like. Portions 201(n) may be stored within the same storage device 120, or alternatively at multiple different storage devices 120(n). Optionally, at least some of the storage devices are associated with different hosting services, platforms, corporations, and/or enterprises. Optionally, client 110 ensures not to store at any single storage device 120(i) and/or with any single enterprise a sufficient number of portions 201(n) required to recover file 200. By storing one or more of portions 201(n) at different platforms, no given platform has access to the portions required to recover file 200. Furthermore, n and/or q may be vary for different files shared by client 110, preventing an unauthorized entity from determining how many portions 201(n) are required to recover file 200. Additionally or alternatively, client 110 may store portions 201(n) using an anonymous router, such as TOR, to prevent the mutual association of portions 201(n) as a result of having a common originating IP address.

Client 110 obtains from storage device 120 the locator strings L(n), and for each portion 201(i), encrypts each L(i), or a portion thereof, using the associated encryption key $K_I(i)$. For example, L(1), L(2) and L(3) for portions 201(1), 201(2), 201(3), are each encrypted using algorithm $ENC_L$ with the associated keys $K_I(1)$, $K_I(2)$, $K_I(3)$, to produce encrypted strings given by $ENC_L(K_I(1),L(1))$, $ENC_L(K_I(2), L(2))$ and $ENC_L(K_I(3),L(3))$, respectively. The encrypted locator strings are stored with their associated CipherTxT(i), i=1 . . . 3 allowing the locators to be subsequently accessed using the ciphertexts.4 Since $ENC_L$ is symmetric, the locators may be subsequently decrypted using the same key used for the encryption.

Reference is now made to FIG. 1E, which shows an exemplary implementation of a server-side index resource 116 that may be queried to retrieve portions 201(n) responsive to queries for CipherTxT(n). Client 110 may store the multiple CipherTxT(n) with their associated encrypted locator strings $ENC_L(K_I(n), L(n))$ at index 116, as multiple cipher-text/encrypted locator pairs via a server 116a over network 102. A server side application configured with server 116a may provide read and write services to and from index 116, allowing any of clients 114 and 110 to access index 116 accordingly. It may be appreciated that maintaining index 116 at server 116a is not meant to be limiting, and index 116 may be stored locally.

The pairs may be stored in a manner to prevent identifying pairs associated with the same file, while allowing easy retrieval responsive to a query. For example, the pairs may be stored according to an alpha-numeric order of the ciphertext, thereby scrambling the positions of associated ciphertexts throughout the index, while allowing searching for the ciphertext using efficient techniques. The pairs may conform to a uniform format such that pairs belonging to one file cannot be distinguished from pairs belonging to a different file.

The search space for CipherTxT(n) may be very large, including many characters and a large alphabet such that the probability of an unauthorized agent correctly guessing all of the CipherTxT(n) or subset thereof that are required to recover any file 200 is very low. For example, each of CipherTxT(i) may be 30 characters long and derived from an alphabet of order $10^3$ yielding a search space in the order of $10^{90}$. On the other hand, deriving the set of CipherTxT(n) or subset thereof required to recover file 200 is relatively easy for an authorized user possessing the plain-text term and the keys $K_I(n)$. Furthermore, due to the large search space, the probability of collisions within index 116 may be very low. Optionally, prior to storing the encrypted pairs, client 110 may query for each of the generated CipherTxT(i) and, should a collision be discovered, generate a new set of keys $K_I(n)$ for deriving a new set of ciphertexts.

Referring back to FIG. 1D, subject to authorization of device 108, client 110 may provide client 114 with cipher information for generating CipherTxT(n), such as over a secure channel that bypasses network 102. For example, the cipher information may include any of: the plain text tag, the index encryption keys $K_I(n)$, the file encryption key $K_F$, the seed/passphrase for generating $K_I(n)$, and/or the number of portions m that are needed to be retrieved in order to recover the file. For example, if file 200 was encrypted using (q,n)-secret sharing, m=q<n, alternatively, if file 200 was encrypted and then divided up into n portions, m=n. Optionally, the passphrase may be the plaintext tag which may be provided to client 114 independently, such as via a private exchange between the users of devices 106 and 108. Optionally the number of required portions m is predefined, and thus in some embodiments there is no requirement for client 114 to receive cipher information from client 110 to recover the file.

Figure 1F:
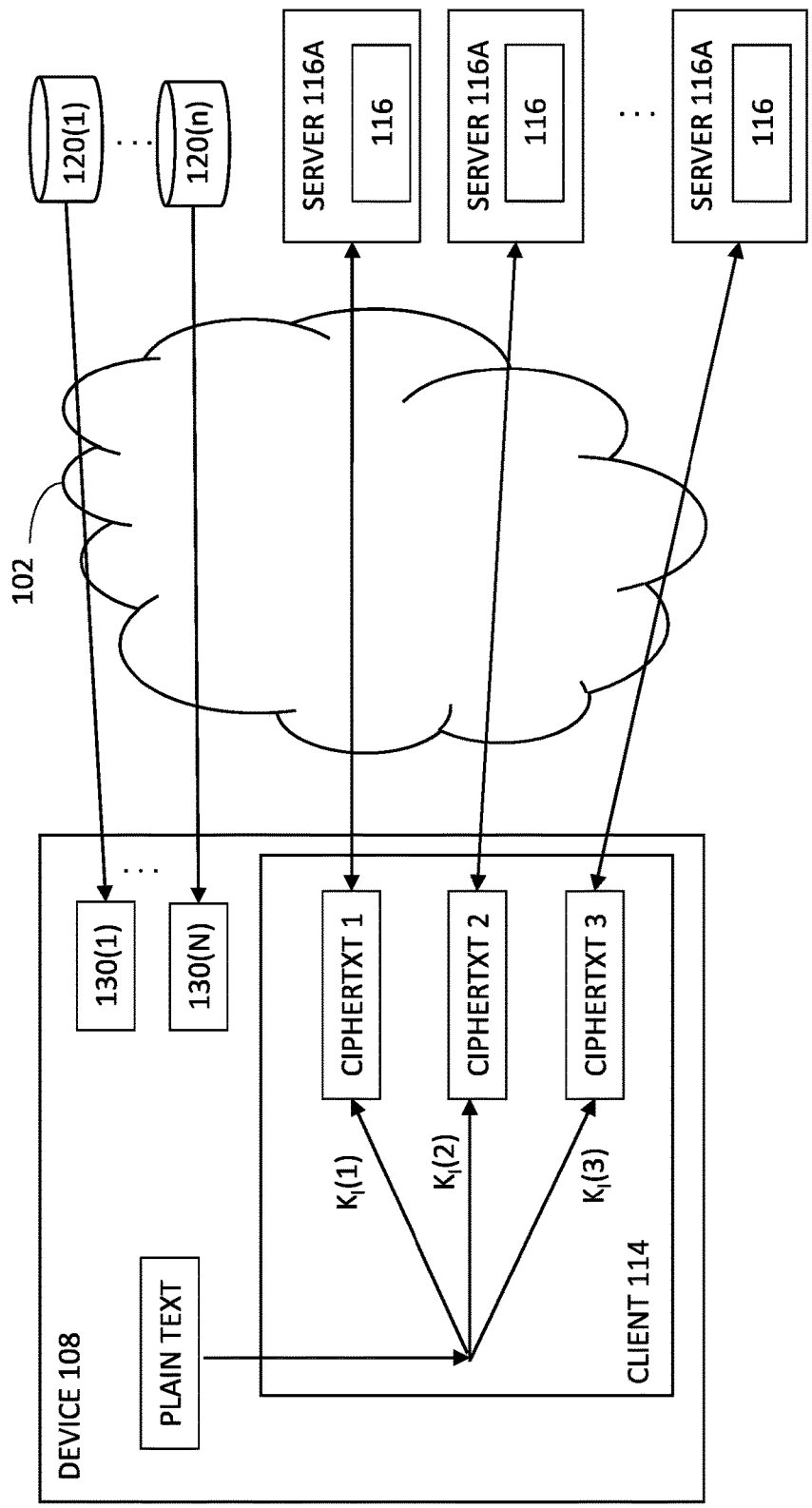

Referring to FIG. 1F, the inner encrypted tier of client 114 receives the plain-text tag as a search query from a user via the outer plaintext tier. Client 114 obtains the required encryption keys, such as by using the cipher information received from client 110 to derive the keys from the key derivation function, and encrypt the tag multiple times using the index encryption keys, to derive the search queries, CipherTxT(i), i=1 . . . m.

Client 114 may communicate with index 116 over network 102 and may submit the search queries to index 116 to retrieve their associated encrypted locators L(m). The encrypted locators L(m) may then each be decrypted by client 114 using the respective index encryption keys used to derive the search queries. Referring to the example shown in FIG. 1E, in response to querying for CipherTxT(1), CipherTxT(2), and CipherTxT(3), client 114 retrieves their associated encrypted locator addresses, $ENC_L(K_f(1), L(1))$, $ENC_L(K_f(2), L(2))$, and $ENC_L(K_f(3), L(3))$ which may be decrypted using keys $K_f(1)$, $K_f(2)$, and $K_f(3)$, respectively, for retrieving portions 201(1), 201(2), and 201(3) to recover file 200. Other suitable implementations for storing encrypted locator strings $ENC_L(K_f(n), L(n))$ with the corresponding CipherTxT(n) may be similarly be used.

Client 114 uses the decrypted locators to retrieve portions 201(m) from their storage locations at storage device 120. For example, client 114 may submit the decrypted locators to a data retrieval application 130, such a browser application that is configured with device 108 to retrieve data via network 102. The retrieved portions 201(m) may be used to recover file 200 in accordance with the decryption scheme corresponding to the encryption algorithm $ENC_F$, and the required file decryption key. For example, if file 200 was encrypted using a symmetric algorithm, $K_F$ may be used to decrypt the file, where $K_F$ was either derived locally at device 108 using the key derivation function, or otherwise received. Alternatively if file 200 was encrypted using an asymmetric algorithm, a private key may be used to recover file 200.

Optionally, client 114 may retrieve portions 201(m) via multiple different file retrieval applications 130 configured with device 108 to prevent any one application, or browser from mutually associating the retrieved portions, or webpages. Optionally, Client 114 may ensure not to retrieve from any one file retrieval application 130 a sufficient number of portions to recover file 200.

Either of client 114 and/or client 110 may use an anonymous identity via an anonymous router such as TOR when submitting queries and/or write commands to index 116 to prevent mutually associating the ciphertexts as a result of detecting that the queries originated from the same IP address.

Figure 1G:
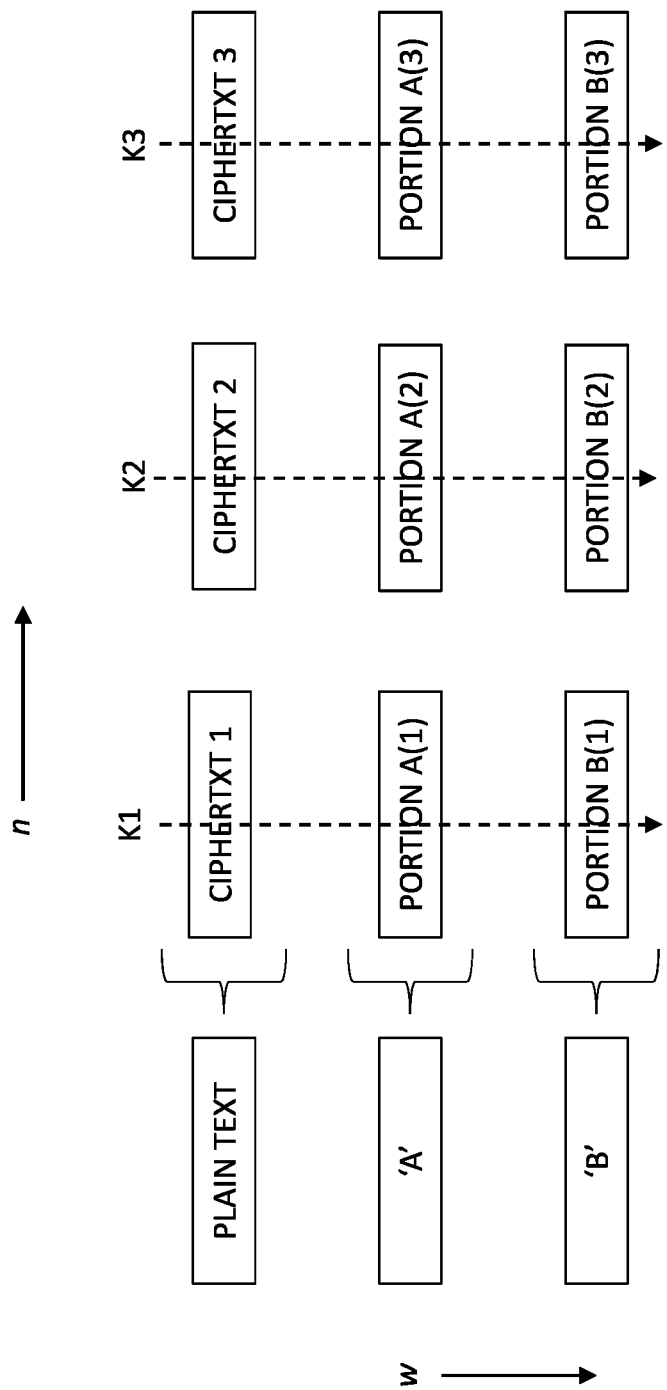

The technique above may be used to share multiple files tagged with the same plaintext tag, as follows. Reference is now made to FIG. 1G which illustrates an implementation for sharing multiple files using the same plaintext tag, in accordance with an embodiment. Each of multiple w files 200(w) may be encrypted into multiple n portions as described above, to yield w×n portions 201(w)(n). These are illustrated in FIG. 1G as File A and File B having portions A(1), A(2), A(3), B(1), B(2), and B(3) for w=2, and n=3. The plain text tag may be encrypted as above using $K_f(1)$, $K_f(2)$, and $K_f(3)$ to yield 3 unique ciphertexts. Each CipherTxT(i) derived using $K_f(i)$ may index the i$^{th}$ encrypted portion of each of the w files, as indicated by the dashed lines. Thus CipherTxT(1) indexes Portion A(1) and Portion B(1) comprising the first portions of each of File A and File B. Similarly CipherTxT(2) and CipherTxT(3) index the second and third portions of each of File A and File B, respectively. Each query for CipherTxT(i) may retrieve w portions, 201(j)(i) for j ∈ {1 . . . w} and querying for all n ciphertexts retrieves w×n portions.

Recovering w files from w×n portions requires sorting the portions according to their respective files. One method to overcome this would be to assign a different file identifier (ID) to each file and store each portion with its file ID. On retrieving the portions, client 114 could extract the file ID, sort the portions according to the file ID, and recover each of file from its sorted portions. However, while the portions are stored at storage device 120 or in transit over network 102 an unauthorized agent may identify the common file ID, and associated the portions as belonging to the same file.

A solution to this may be to encrypt each file ID n times using each of keys $K_f(i)$ to yield w×n unique encrypted file identifiers denoted by: $ENC_L(K_f(i), fileID(j))$ for i ∈ {1 . . . n}, j ∈ {1 . . . w}. Each file ID encrypted with key $K_f(i)$ may be stored with the portion indexed by CipherTxT(i).

Table 1 below illustrates a simplified example of this scheme that may be mapped onto the array arrangement of file portions shown in FIG. 1G. The file IDs for File A and File B, 'A' and 'B', are indicated in the rows of Table 1, corresponding to w in FIG. 1G, and the encryption keys $K_f(1)$, $K_f(2)$, $K_f(3)$ are shown as columns, corresponding to n in FIG. 1G. Each file ID is encrypted using each of keys $K_f(1)$, $K_f(2)$, $K_f(3)$ resulting in six unique encrypted file IDs, shown in the cells of Table 1:

TABLE 1

| File ID | Key | | |
|---|---|---|---|
| | $K_f(1)$ | $K_f(2)$ | $K_f(3)$ |
| A | $ENC_L(K_f(1), A)$ | $ENC_L(K_f(2), A)$ | $ENC_L(K_f(3), A)$ |
| B | $ENC_L(K_f(1), B)$ | $ENC_L(K_f(2), B)$ | $ENC_L(K_f(3), B)$ |

Each of these encrypted file IDs may be included with its corresponding portion of FIG. 1G. Thus, $ENC_L(K_f(1), A)$ is stored with Portion A(1), $ENC_L(K_f(1), B)$ is stored with Portion B(1), etc. Dummy characters may be added as necessary to any of the file IDs, locator strings, and plaintexts, to allow encrypting using the same key. On retrieving the portions, client 114 may extract the file IDs and decrypt them using the associated key. The w×n portions may be sorted accordingly and used to recover the w files.

Any given file 200 may be separately shared with multiple different users or groups of users using a different set of encryption keys and ciphertexts for each user and/or group. As an example, a study of a patient's progress regarding an experimental drug 'XYZ', may simultaneously belong to two different archives, one for sharing with the patient undergoing the treatment, and the other with a group of doctors following the progress. Two different sets of index encryption keys, $K_P(n)$ and $K_D(n)$ may be generated and used to derive from the plain text tag XYZ two sets of ciphertexts, CipherTxT$_P$(n) and CipherTxT$_D$(n), which are used to separately index the file. Access to keys $K_P$ and $K_C$ may be provided to each of the patient and doctors, respectively, allowing each to derive Cipher$_P$(n) and Cipher$_D$(n) from the plain text 'XYZ' and retrieve the file. Alternatively, a different plain-text tag may be used for each user/group.

By enabling a single file to be separately shared with multiple different users using a different set of encryption keys/plaintexts, and enabling multiple files to be shared using the same set of encryption keys/plaintexts, the system and method described herein may provide a flexible and secure file sharing platform that allows users to define how and with whom to share their data. Additionally, once a file is indexed, it can be subsequently modified without affecting the indexing, allowing modifications to be felt across all users to maintain data integrity. Similarly, new files can be added, indexed using existing index terms, allowing a single query to retrieve an updated archive of multiple files.

Optionally, the number of indexing keys (u) used to derive the n ciphertexts may be less than n. Since u encryption keys may be combined into as many as $2^u-1$ different non-null combinations, each ciphertext may be derived from a different combination of keys, by encrypting the plaintext multiple times using each key of the combination.

Thus, the number of portions n and/or the number of index encryption keys u may be selected according the relationship $n \leq 2^u-1$. As a trivial example, 2 keys may be grouped into 3 different non-null combinations: {K1}, {K2}, {K1,K2} which may be used to generate 3 different ciphertexts from the same plaintext by encrypting with each of: K1, K2, and both of K1 and K2.

Optionally, only some of the $2^u-1$ combinations of the u encryption keys may be used. For example, the plaintext may be encrypted by those combinations of keys having the same cardinality, such as only the pairs, or triplets of the u encryption keys. Optionally, the cardinality corresponds to the number of prime factors of n, which will be described in greater detail below with respect to Table 2.

Alternatively, the combinations of the u keys used to derive the ciphertexts may be selected in accordance with a maximum or minimum cardinality constraint such that each ciphertext is derived using a minimum or maximum number of encryption steps.

Since the cardinality of the $2^u$ combinations is distributed binomially. Using the trivial example above with 3 keys, there is a ⅔ probability that the ciphertext is derived by encrypting the plaintext once, and a ⅓ probability that the ciphertext is derived by encrypting the plaintext twice. Thus, in one embodiment, the combinations of the u encryption keys may be selected to have a variable and uniformly distributed cardinality, providing an additional uncertainty for a hacker to contend with. For example, u=5 yields 31 non-null key combination: 5 combinations of 1 key, 10 combinations of 2 keys, 10 combinations of 3 keys, 5 combinations of 4 keys, and 1 combination of 5 keys. The minimum cardinality may be set as 2, and a uniform cardinality may be imposed over the sets. Thus, 5 combinations of each of 2 keys, 3 keys, and 4 keys may be used to generate 5×3=15 ciphertexts for indexing 15 file portions, using 5 encryption keys. The probabilities of encrypting the plaintext 2, 3, or 4 times to derive any of the ciphertexts is uniform, in this case ⅓.

By imposing a variable cardinality on the key combinations used to derive the ciphertexts, the complexity for a hacker to decrypt the ciphertext/locator pairs may be further increased. n and/or u may be selected in accordance any of the above constraints.

Alternatively, if the multiple applications of the symmetric encryption $ENC_L$ are non-commutative, the permutations of each key combination may be used to derive additional ciphertexts from the same plaintext, requiring even fewer keys to generate additional encrypted indexing terms.

The associated locators and file IDs may be similarly encrypted and decrypted using the combination of keys used to derive the ciphertexts. It may be appreciated that in addition to reducing the number of encryption keys, this technique may increase the complexity for decrypting the locators and file IDs.

In some embodiments, the retrieved file portions 201(n) need to be combined in the correct sequence in order to recover file 200. For example, file 200 may be encrypted into a file 201, and partitioned into n encrypted file portions such that concatenating the n encrypted file portions reconstructs the encrypted file 201, and which may then be decrypted to recover file 200, where n may be selected in accordance with constraints, such as portion size, a minimal or maximum number of portions, and/or any of the constraints described above. It may be appreciated that storing the n portions divided thus may demand less memory than when storing file portions derived using secure secret sharing.

Since the n portions may be recombined n! ways, client 110 may map the portions according to the sequence of the encryption keys used to derive the ciphertexts. The sequence of the encryption keys may thus be used to determine the sequence for recombining the retrieved portions. For example, the first key derived from the key derivation function may be used to index and subsequently retrieve the first portion, the second derived key may be used for the second portion, etc.

To use fewer keys than the number of portions, client 110 may map the n file portions into the cells of an array, each dimension of which corresponds to a different factor of n. Each dimension of the array is assigned a set of encryption keys, such that each cell is uniquely indexed by a unique combination of keys—one from each set. The combination of the encryption keys thus serves as coordinates for positioning the file portions within the array.

For example, the sequence of keys derived from the key derivation function may be assigned sequentially to index the array, and both clients 110 and 114 can assign the same sets of keys to index the cells of the same array at both the uploading and retrieving ends. Each portion is indexed and subsequently accessed using its unique combination of keys. On retrieving a portion, its position within the file can be determined from the key combination used to derive its search query. The number of keys required to derive n ciphertexts is thus the sum of the factors of n. In addition to the encryption, the factorization of n, corresponding to the dimensions of the array, may be used to encode and decode the data since different factorizations of n yield different combinations of the encryption keys, and different schemes for the order of the encrypted file portions. This property may be leveraged to securely share the file between clients 110 and 114, by synchronizing the factorization of n for both the uploading and the retrieving of the file portions.

Optionally, the prime factors of n may be selected to define the array. Since the set of prime factor of n is unique, an array arranged in increasing (or decreasing) order of the prime factors is unique as well. Thus, knowing n and a predefined order for the prime factors of n, each of clients 110 and 114 can create the identical array without having to exchange information.

Thus, knowing the seed/passphrase for the key derivation function, the plain text tag, and n may be sufficient for recovering the file. Using this cipher information, client 114 can construct the unique array indexed with the keys, generate the search queries and correctly map the retrieved portions to recover the file.

An example of this is illustrated in Table 2 below, which shows a 2×5 array that uses 7 keys to encrypt 10 unique index terms for each of 10 file portions, and position the 10 file portions on retrieval. Clients 110 and 114 each factor 10 into the prime factors, 2 and 5 and each create a 2×5 array. Using the same seed, each of clients 110 and 114 derive 7 encryption keys K1 . . . K7, and assign them sequentially in the order that they were derived to index the array: K1 and K2 are assigned to the 2 rows, and K3 . . . K7 are assigned to the 5 columns. Thus, each cell in the array is indexed by a unique combination of a row key and a column key.

Client organizes the 10 encrypted file portions, indicated by the numbers in each cell, column-wise, however this is not meant to be limiting, and any ordering scheme may be used:

TABLE 2

|    | K3     | K4     | K5     | K6     | K7      |
|----|--------|--------|--------|--------|---------|
| K1 | 1: K1, K3 | 3: K1, K4 | 5: K1, K5 | 7: K1, K6 | 9: K1, K7 |
| K2 | 2: K2, K3 | 4: K2, K4 | 6: K2, K5 | 8: K2, K6 | 10: K2, K7 |

Client 110 indexes the first portion with the ciphertext derived by encrypting the plaintext using keys K1 and K3; similarly, the second portion is indexed with the ciphertext derived by encrypting the plaintext using keys K2 and K3, etc. Each ciphertext is derived by encrypting the plaintext v times, where v is the number of prime factors of n.

On retrieving the portions, client 114 determines the position of the retrieved portions according to the combination of encryption keys used to derive its search query. Thus, the portion retrieved in response to querying for the ciphertext derived using the key combination K1 and K3 is inserted into the top left cell, corresponding to the first portion, the portion retrieved in response to querying for the ciphertext derived using K2 and K3 is inserted into the bottom left cell, corresponding to the second portion, etc. Once all the portions are retrieved, and the array is filled, the portions may be recombined in their correct order to recover the encrypted file, which may be decrypted to recover the original plaintext file.

Although a two dimensional array is shown, this is for illustrative purposes only, and the number of dimensions of the array, and thus the number of times the plaintext is encrypted to derive each ciphertext, corresponds to the number of prime factors of n.

Thus, the encryption keys play multiple roles: they encode a single plaintext to derive multiple index entries for each of the file portions; since the encoding comprises encryption, the index entries for any given file are hard to guess by a non-authorized entity; additionally the unique combination of keys used to derive the indexing terms may be used to position the retrieved encrypted file portion. When the portions of multiple files are shared, multiple such arrays may be constructed, one per file, using the fileID to sort the retrieved portions.

It may be appreciated that several implementations for using multiple encryption keys to encode the plaintext for indexing multiple portions have been described, however this is not meant to be limiting and other suitable methods may be similarly used.

The associated locator strings and file IDs may be encrypted and decrypted using the respective combination of keys. In addition to requiring fewer encryption keys, the multiple decryptions required to locate each file portion may increase the complexity for a non-authorized user to recover file 200.

File portions 201(n) may be stored using any suitable method. For example, the portions may be stored as blocks of data within a document-type database. Alternatively, file portions 201(n) may be stored as payloads within unlinked webpages that are inaccessible by web crawlers or robots.

Figure 2A:
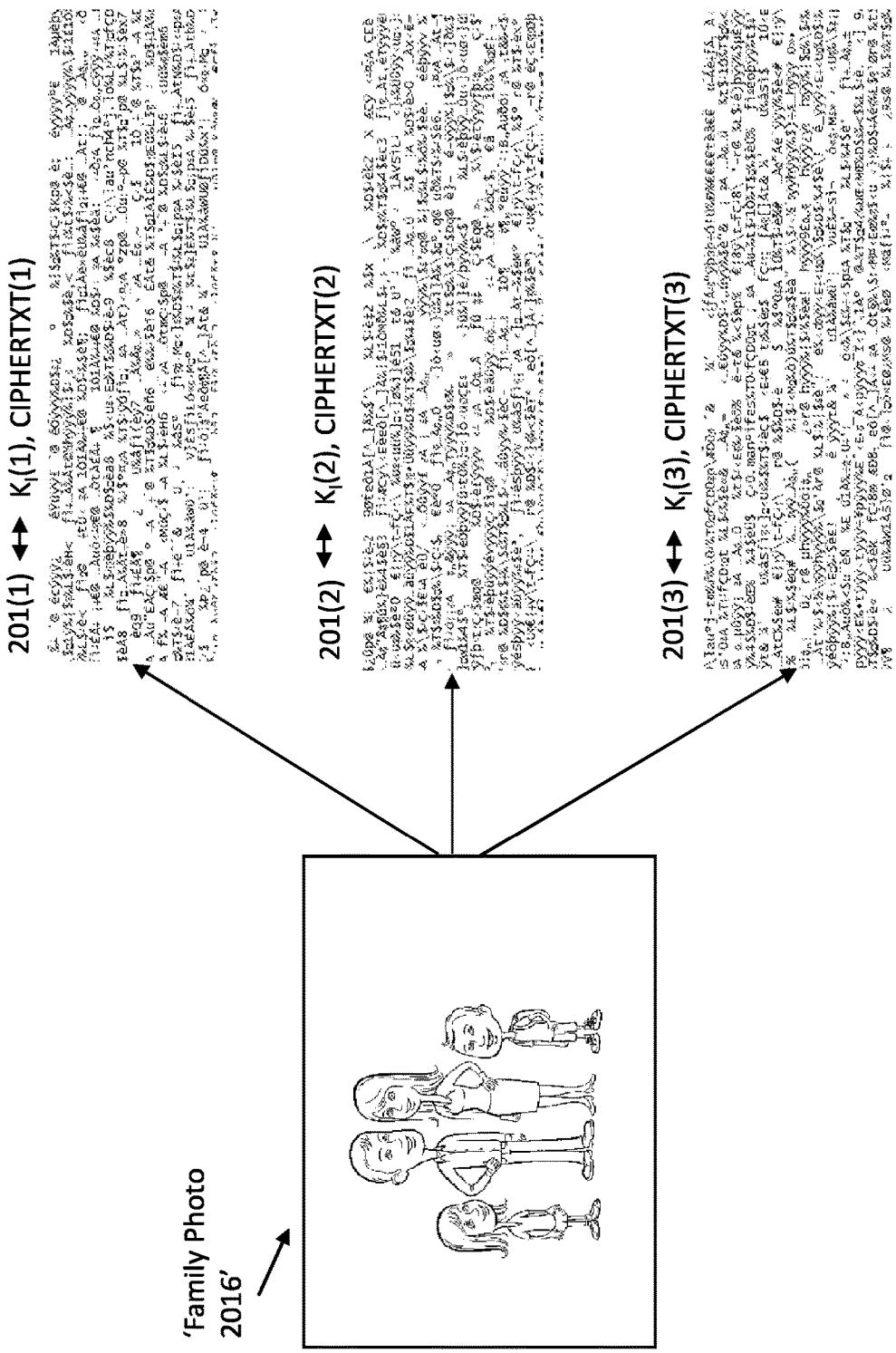
Figure 2B:
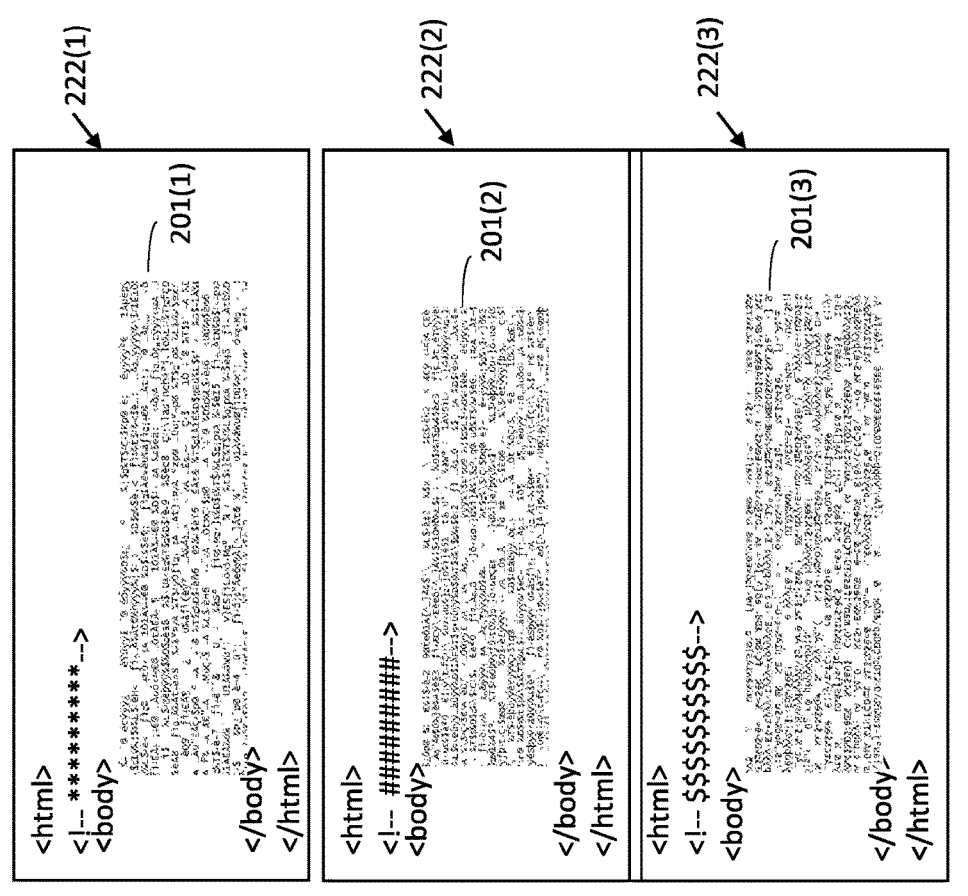

Reference is now made to FIGS. 2A-2B which show an exemplary implementation for storing multiple portions within multiple packets configured as webpages, using the system of FIGS. 1A-1G. An image file 200 may be tagged with the plain text 'family photo 2016'. Client 110 may encrypt the plain-text three times using algorithm $ENC_L$ and keys $K_f(1)$, $K_f(2)$, and $K_f(3)$, for n=3 to derive CipherTxT(i), i-1 . . . 3. Client 110 may use a (2,3) secret sharing technique $ENC_F$ to encrypt file 200 into three portions, 201(1), 201(2), 201(3), of which any 2 are required to recover file 200. Each of portions 201(1), 201(2), 201(3) is associated with a different one of keys $K_f(1)$, $K_f(2)$, and $K_f(3)$, and CipherTxT (i), i=1 . . . 3, respectively. Client 114 may derive a file ID using a hashing function and encrypted the file ID three times using keys $K_f(1)$, $K_f(2)$, and $K_f(3)$ to produce three encrypted file identifiers, $ENC_L(K_f(i), fileID)$ for i ∈ {1 . . . 3}.

Referring to FIG. 2B, client 110 may create three webpages 222(1), 222(2), and 222(3) conforming to a predefined protocol, allowing for subsequent extraction of the file IDs and portions. For example, the encrypted file IDs may be stored as a script comment ('//') between two delimiting <script> </script> tags, or as an HTML comment, between "<!--" and "-->" tags, or any other suitable method that allows subsequent extraction of the encrypted file ID. The encrypted file ID for portion 201(1), 201(2) 201(3), given by the expressions $ENC_L(K_f(1)$, FILE ID), $ENC_L(K_f(2)$, FILE ID), $ENC_L(K_f(3)$, FILE ID) are indicated for illustrative purposes in FIG. 2B as '*********', '#########', and '$$$$$$$$$$', respectively. Similarly, the encrypted portions 201(1), 201(2) 201(3) may be stored within the body of the webpages 222(1), 222(2), and 222(3), between <body> and </body> tags, or alternatively as comments. It may be appreciated that this implementation is illustrative only and is not meant to be limiting.

Client 110 may upload webpages 222(1), 222(2), and 222(3) over network 102 to be hosted at three different storage hosting services 120(n) in association with three different URLs. Client 110 may encrypt the URLs for each uploaded webpage 222(i) using the associated key $K_f(i)$ and store each encrypted URL at index 116 in association with its associated CipherTxT(i), as described above, for subsequent retrieval by client 114.

Client 114 obtains at least keys $K_f(1)$, $K_f(2)$. The user of device 108 may be provided with the plaintext 'family photo 2016', and enters it into a GUI provided by client 114. Client 114 encrypts the plaintext to derive CipherTxT(1) and CipherTxT(2) using keys $K_f(1)$, $K_f(2)$ and $ENC_L$ Client 114 queries index 116 using CipherTxT(1) and CipherTxT(2) to retrieve their associated encrypted URLs, which are decrypted accordingly using keys $K_f(1)$, $K_f(2)$. Client 114 uses the decrypted URLs to retrieve webpages 222(1), 222(2) optionally using two different browser applications 130. Client 114 extracts file portions 201(1) and 201(2) from webpages 222(1), 222(2) and uses them to recover file 200 using a (q,n) secret sharing recovery algorithm corresponding to the above (q,n) secret sharing encryption algorithm. If one of portions 201(1) or 201(2) is corrupted or inaccessible, client 114 may obtain $K_f(3)$ and use it to retrieve portion 201(3).

Optionally, multiple encrypted portions belonging to different files may be stored within the same webpage, allowing clients 110 and 114 to share multiple files using the same set of webpages.

Clients 114 and/or 110 may apply a normalization technique, as are known in the art, to convert any entered plain-text tag to a normalized form prior to encryption by key $K_i$. For example, the normalization may neutralize capitalization of letters, or remove spaces, and thus, either of plain-text tags 'Family' and 'family' may be used to retrieve file 200. Similarly, either of plain-text tags 'photo 2016' and 'photo2016' may be used to recover file 200.

Optionally, each of multiple files may be tagged with more than one plain-text tags, and thus indexed via multiple sets of ciphertexts, allowing a hierarchical file retrieval platform that allows retrieving different files responsive to different plain text search queries using the same or a different set of keys $K_f(n)$, allowing to structure and organize secure access to data. For example, different levels of authorization may be granted by disclosing different plain-texts to different users all sharing the same set of keys $K_f(n)$, or subsets of keys.

Figure 3:
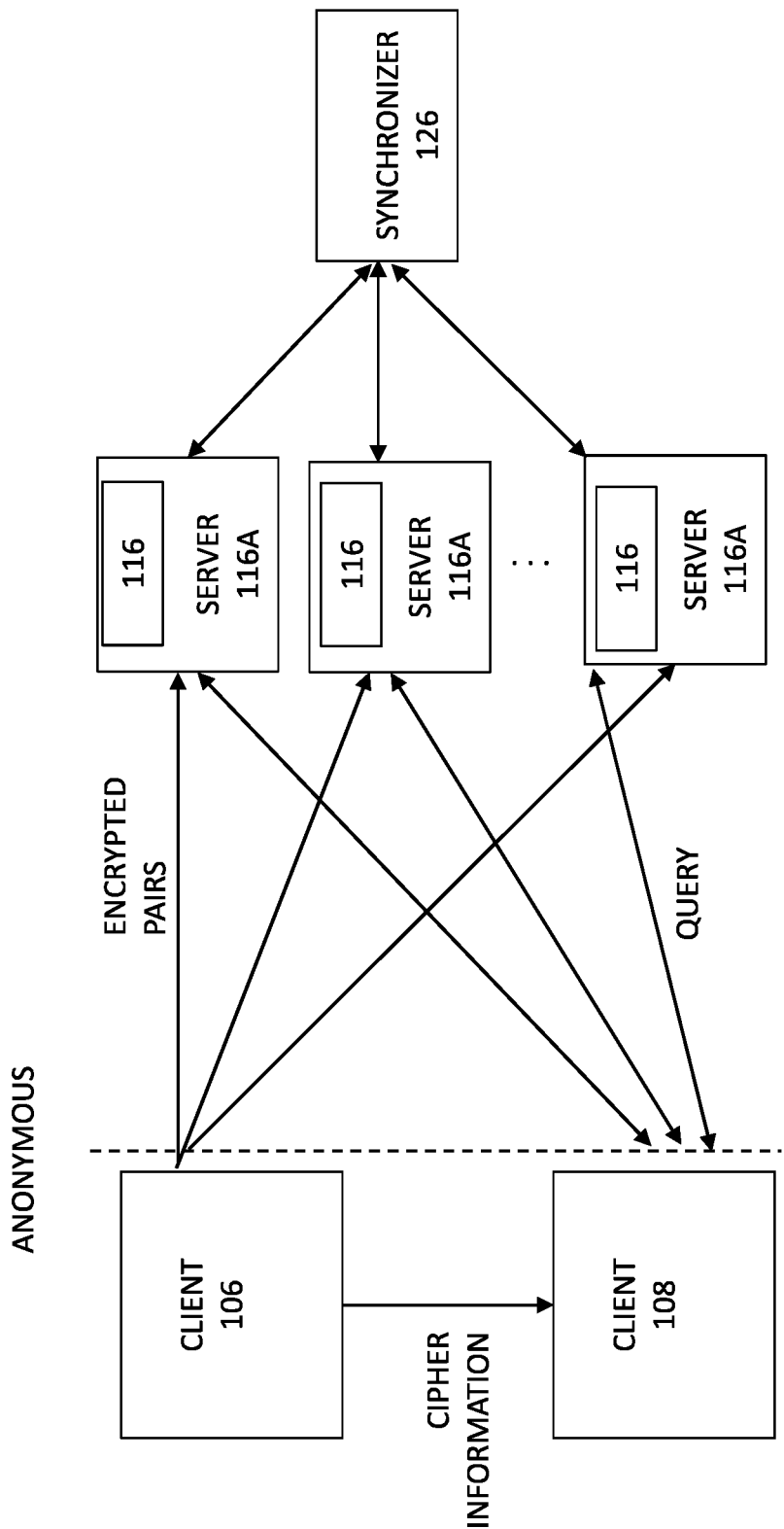
FIG. 3 illustrates a system to index the multiple ciphertext/locator pairs, in accordance with an embodiment.

Additionally, the memory blocks for storing portions 201(n) may be set up in advance as placeholders and indexed, and the portions uploaded subsequently Reference is now made to FIG. 3 which illustrates a system to index the multiple cipher-text/locator pairs, in accordance with an embodiment. To prevent mutually associating the multiple cipher-text/locator pairs by monitoring index 116 and observing that the pairs were written and/or read to/from index 116 within a short time frame, or originated from the same IP address, multiple copies of index 116 may be distributed at different servers 116a. Clients 110 and 114 may distribute the read/write requests across the different indexes 116, while insuring not to write and/or query from any one index 116 a sufficient number of ciphertext/locator pairs to recover file 200. To ensure all of indexes 116 are updated, a synchronizer 126 may periodically update indexes 116, such as by logically OR'ing the inclusion of each cipher-text locator pair across all the indexes 116 and adding any missing pairs as necessary. The time interval for updating may be balanced against the frequency of uploading files by client 110, i.e. a long time interval may allow a sufficient number of cipher-text/locator pairs to be written to indices 116(n) such that correctly grouping any newly written entries into their corresponding file may be considerably complex, whereas a short time interval may increase reliability for subsequent queries by client 114. If clients 110 and 114 access index 116 anonymously, in a high traffic environment, the task of grouping the index queries belonging to any one file may be considerable.

In one embodiment, index 116 may be implemented via a publicly accessible search engine. Each ciphertext/encrypted locator pair may be stored within an indexable webpage. The ciphertext may be stored in an indexable portion of the webpage, such as within a pair of <header>, </header>; <title>, </title>, and/or <body>, </body> hypertext markup language (HTML) tags, or any other suitable indication to the search engine to index the webpage according to the ciphertext. The encrypted locator may be stored in a manner that is not indexable, such as a Javascript or HTML comment, or padded to exceed the indexable token length. Client 110 may submit such a webpage for each ciphertext/encrypted locator pair for indexing by the search engine via a webmaster tool. Once indexed, client 114 may query the search engine using the ciphertexts, retrieve the webpages and extract the encrypted locators to retrieve the portions, as described above.

It may be noted that one or more of the steps described above as being performed by either of client 110 or 114 may be performed by a server side application associated with any of clients 110 and 114, such as by implementing one or more portions of clients 110 and/or 114 as cloud-computed applications.

Optionally, device 106 may be operative within the IoT and may be configured with one or both of clients 110 and 114. Client 110 may store one or more parameters, such as one or more settings for operating device 106. The plain-text tag may be any suitable plain-text for retrieving the parameters, such as the device ID of device 106, or a password. Responsive to receiving the plaintext search query, client 114 may generate the ciphertexts and retrieve the setting to operate device 106, accordingly. The plaintext may be received automatically by client 114 responsive to a signal such as a time, temperature, GPS, or other signal or alert. Optionally, the received signal may be the plaintext search query.

Similarly, device 106 may program device 108 by tagging parameters for operating device 108 using the device ID of device 108 and/or device 106 and storing as above. Responsive to a signal, device 108 may initiate client 114 with the device ID as the plain-text, retrieve the parameters, and operate according to the received parameters. For example, device 106 may be a mobile phone, and device 108 may be an air conditioner. Device 106 may set the thermostat, timer and fan setting of device 108 as described above and store them in encrypted format on the cloud. Responsive to a signal, such as time, temperature, or Global Positioning System (GPS) signal indicating the proximity of device 106, device 108 may retrieve the parameters using its ID as the plaintext, decrypt the parameters and use them to operate accordingly. These examples are meant to be illustrative only, and other suitable methods for operating devices 106 and 108 securely over network 102 using the methods described herein may be used.

Figure 4A:
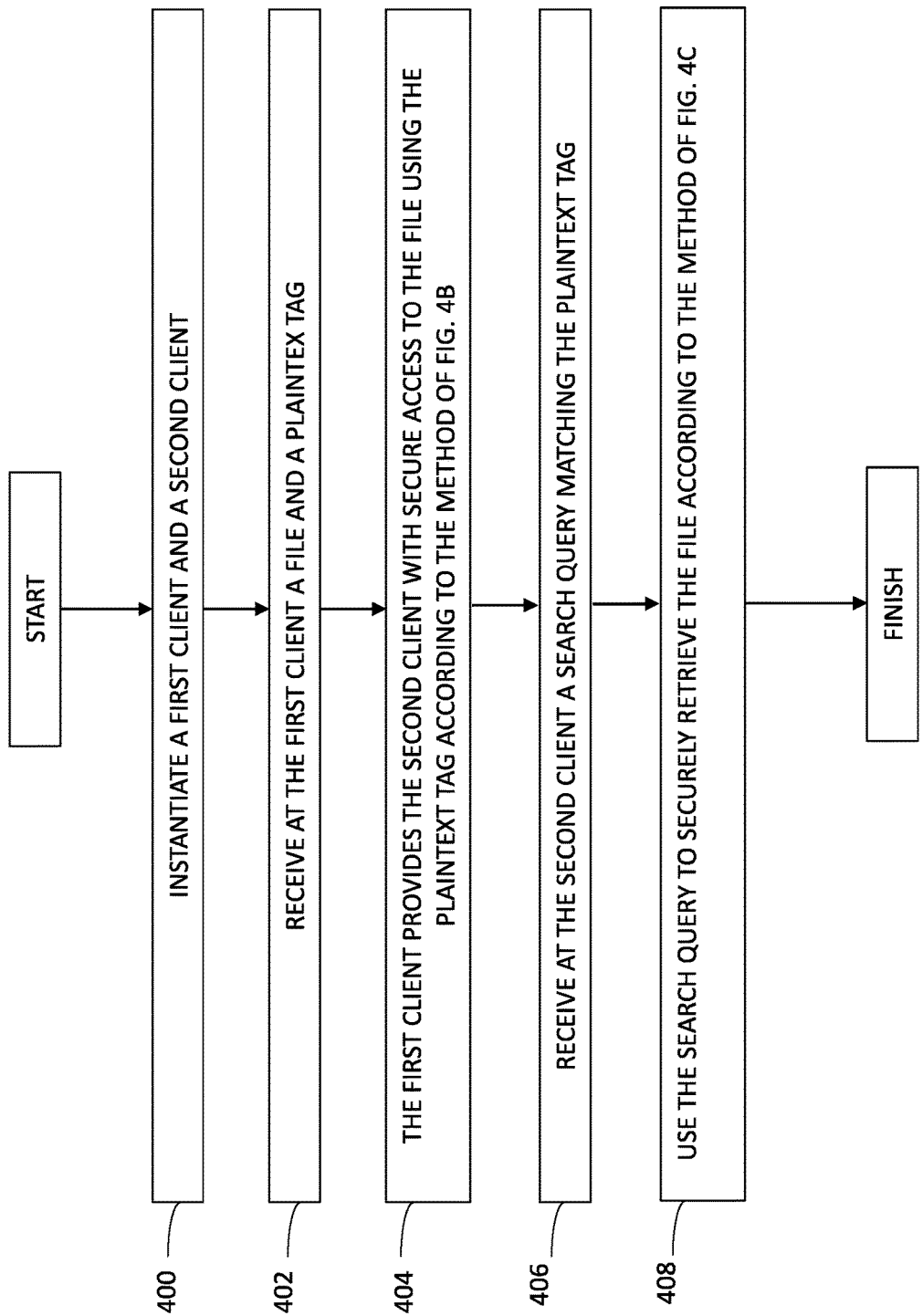
FIGS. 4A-4C show a flowchart of a method for sharing an encrypted file using a search query, in accordance with an embodiment.

Reference is now made to FIG. 4A which shows a flowchart of a method for sharing an encrypted file, in accordance with an embodiment. A first and second client may each be instantiated (Step 400). Optionally, the first client may be instantiated on one device and the second client may be instantiated on a different device. Any of the devices may be operable with the IoT. The first client receives a file and a plaintext tag (Step 402) and provides the second client with secure access to the file using the plaintext tag according to the method of the flowchart of FIG. 4B (Step 404). The second client receives a search query comprising the plaintext tag (Step 406), and uses the search query to securely retrieve the file using the method of the flowchart of FIG. 4C (Step 408).

Figure 4B:
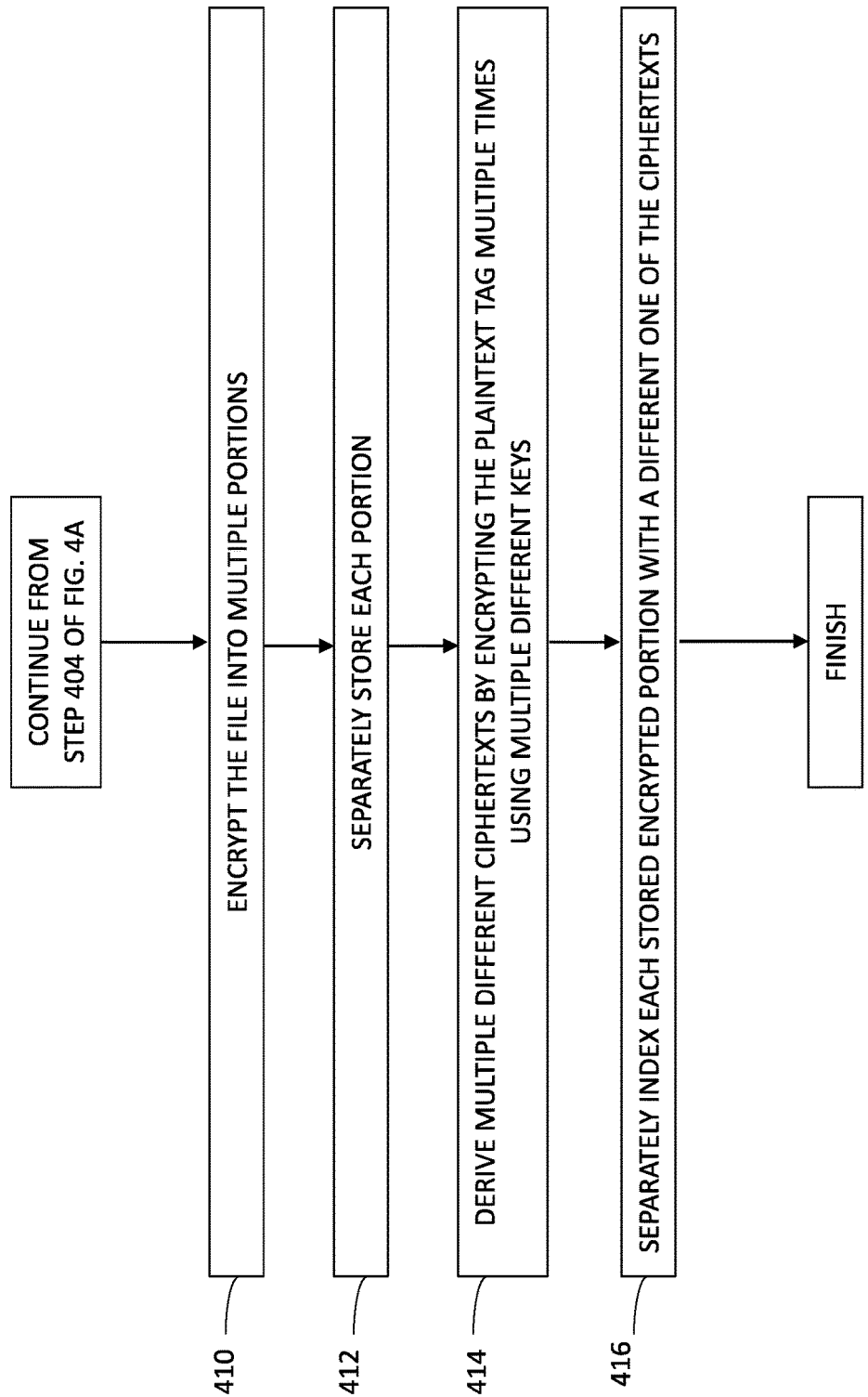

Reference is now made to FIG. 4B which shows a flowchart of a method for the first client to provide the second client with secure access to the file. The received file may be encrypted into multiple encrypted portions (Step 410). Each encrypted portion may be separately stored at a storage device (Step 412). Multiple different ciphertexts may be derived by encrypting the plaintext tag using multiple different encryption keys (Step 414). Each stored encrypted portion may be separately indexed at an index with a different one of the ciphertexts (Step 416).

Figure 4C:
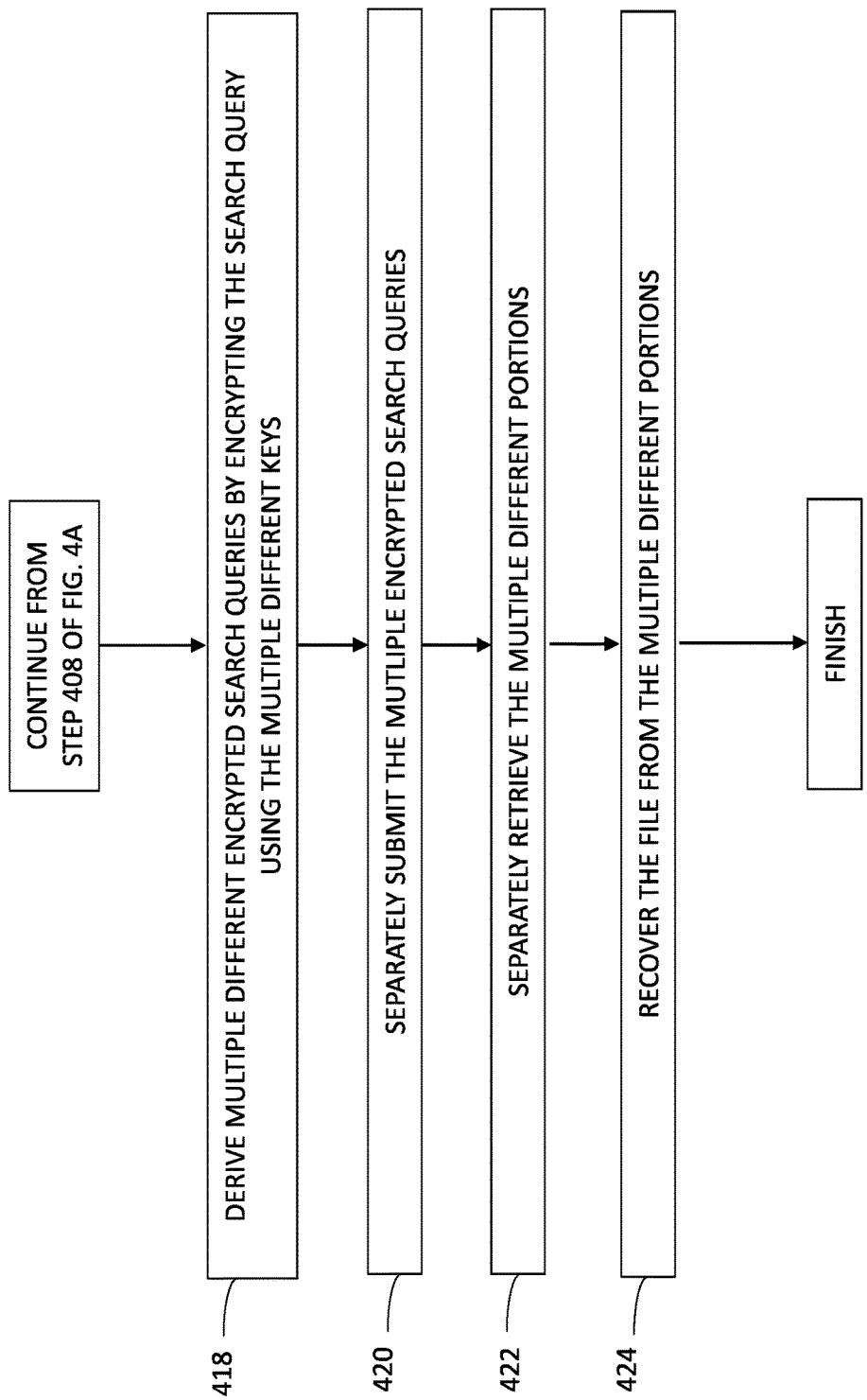

Reference is now made to FIG. 4C which shows a flowchart of a method for the second client to securely retrieve the file. Multiple different encrypted search queries may be derived by encrypting the search query using the multiple different encryption keys (Step 418). The multiple encrypted search queries may be separately submitted to an index (Step 420). The multiple encrypted portions may be separately retrieved from the storage device (Step 422), and the file may be recovered from the multiple encrypted portions (Step 424).

The ciphertexts may be derived from the plaintext by applying a symmetric encryption algorithm to the plaintext using a unique combination of the encryption keys, where a single key is understood to be a combination of one key. Each stored encrypted portion may be separately indexed by storing the ciphertext indexing the portion together with an encrypted storage location string of the stored encrypted portion, where the encrypted storage location string was encrypted using the symmetric encryption algorithm and the unique combination of encryption keys used to encrypt the indexing ciphertext.

Similarly, for retrieving the multiple encrypted portions, for each encrypted search query, the encrypted locator string stored with the ciphertext corresponding to the search query may be retrieved, the encrypted locator string may be decrypted using the unique combination of the encryption keys used to derive the encrypted search query, and the encrypted file portion may be retrieved from the storage device using the decrypted locator string.

The file may be encrypted using any known technique, such as by applying a symmetric scheme, or an asymmetric scheme that uses a public/private key pair, or by using a different type of file encryption key. Alternatively, the file may be encrypted by applying a (q,n) threshold secret-sharing scheme wherein n is the number of stored encrypted portions and where q are the number of portions required to recover the file. In this case the second client may retrieve the file by submitting q or more search queries to retrieve q or more of the encrypted portions.

Optionally the first client may provide the second client with cipher information to allow the second client generate the ciphertexts from the plaintext tag. For example, the cipher information may include the number of portions required to retrieve the file. Additionally or alternatively, the first client may provide the second client with the multiple different encryption keys for encrypting the plaintext tag. The first client may provide the second client with the file encryption key for decrypting the file. Alternatively both the first and second clients may obtain any of the encryption keys from an authorized third party. Optionally, the first client may be configured with a key derivation function, and may derive any of the encryption keys for encrypting the file and/or the indexing terms using the function and a seed. For example, the seed may be the plaintext tag. Optionally, the second client is also configured with the key derivation function and may derive any of the encryption keys using the function and the seed. Optionally, the second client may derive the key required to decrypt the retrieved file portions from the key derivation function. Optionally, the first client provides the second client with the seed.

Optionally, the number of multiple encryption keys for deriving the ciphertexts is fewer than the number of stored encrypted portions. For example, the number of encrypted file portions n, and the number of index encryption keys u may be determined according to the relationship $n \leq 2^u - 1$, corresponding to all the possible non-null combinations for the u keys. In this case, encrypting the plaintext tag into the multiple different ciphertexts comprises, for each ciphertext, encrypting the plaintext v times using a different one of the $2^u - 1$ non-null combinations of the u encryption keys, where v is the cardinality of the combination. Optionally, any of n and u may be selected in accordance with a constraint imposed on the cardinalities of the combinations, such as imposing a uniform distribution on the cardinalities, or a minimum, maximum, or constant cardinality.

Optionally, the combinations of the encryption keys used to derive the ciphertexts may be used to sort the retrieved file portions. Each ciphertext may be derived by encrypting the plaintext tag using a different combination of the encryption keys, where the encrypted file portions are sorted according to the combinations of the keys. For example, the file portions may be sorted into an array whose cells are indexed by the encryption keys, and thus each file portion is assigned a unique combination of the encryption keys. The second client may encrypt the search query in a similar manner: each ciphertext may be derived by encrypting the search query with one of the combinations of the encryption keys. The second client may create the same array as the first client and sort the retrieved portions according to the multiple combinations.

It may be appreciated that when the dimensions of the array correspond to the prime factors of the number of file portions, n, and organized according to an order of the prime factors, such as smallest to largest, or vice versa, the array is unique, and thus, knowing n, both the first and second client can create the identical array, allowing the second client to sort the portions according to the key combination used to retrieve them and correctly recombine them to decrypt the file. Thus, the multiple combinations of the encryption keys may be determined according to the prime factors of n, and the number of keys u corresponds to the sum of the prime factors.

Optionally, the first client may separately index by indexing at multiple different indexes, and the second client may separately submit the multiple separate search queries by distributing the submissions over the multiple different indexes, such that no single index is queried for all the portions required to recover the file.

The first client may provide the second client with secure access to multiple files by querying for the same plaintext tag, and the second client may securely retrieve the multiple files by querying with a search query that matches the plaintext tag. The portions of the multiple files may include information that allows them to be sorted by the second client according to their respective files. The information may be encrypted such that the stored portions of the multiple files do not include any common terms that may be used to associate and/or identify those portions with each other.

Reference is now made to FIG. 5, which shows an exemplary system 500 according to an embodiment. System 500 may include a computing device 510. Computing device 510 may include a hardware processor 520, a storage device 530 and an optional input/output ("I/O") device 540. Hardware processor 520 may include one or more hardware processors, storage device 530 may include one or more storage devices and I/O device 540 may include one or more I/O devices. Hardware processor 520 may be configured to execute the method of FIG. 1. I/O device 540 may be configured to allow a user to interact with system 500. For example, I/O device 540 may include a display, a loudspeaker and/or a printer which may for example output a list of evidence for a user according to the method of FIG. 1. Dedicated software, implementing the method of FIG. 1 may be stored on storage device 530 and executed by hardware processor 520.

In some embodiments, computing device 510 may include an I/O device 540 such as a terminal, a display, a keyboard, a mouse, a touch screen, a recorder, a loudspeaker, a printer, an input device and/or the like to interact with system 500, to invoke system 500 and to receive results. It will however be appreciated that system 500 may operate without human operation and without I/O device 540. In some exemplary embodiments of the disclosed subject matter, storage device 530 may include or be loaded with a user interface. The user interface may be utilized to receive input, such as a context and optionally a content resource and/or provide output, such as a list of evidence, to and from system 500, including receiving specific user commands or parameters related to system 500, providing output, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A query-based system for sharing encrypted data, comprising:
   at least one hardware processor; and
   at least one non-transitory memory device having embodied thereon program code executable by the at least one hardware processor to
   receive an electronic file and a plaintext tag,
   provide secure access to the electronic file using the plaintext tag, and
   responsive to receiving a search query matching the plaintext tag, use the search query to securely retrieve the electronic file,
   wherein providing secure access to the electronic file comprises
   creating multiple (n) encrypted portions of the electronic file,
   storing each encrypted portion separately,
   deriving multiple (n) differently encrypted ciphertexts by applying cipher information to encrypt the plaintext tag multiple times according to a map of the encrypted file portions, wherein the map is based on the cipher information,
   associating each encrypted portion with a different one of the ciphertexts, and
   separately indexing each stored encrypted portion with the associated ciphertext,
   wherein securely retrieving the electronic file comprises
   deriving multiple differently encrypted search queries matching at least some of the n multiple ciphertexts by applying the cipher information to encrypt the search query multiple times according to the map,
   querying using the multiple encrypted search queries,
   retrieving at least some of the n multiple encrypted portions, and
   recovering the electronic file from the retrieved encrypted portions,
   wherein the cipher information comprises a seed and n,
   wherein applying the cipher information comprises generating multiple encryption keys from a key generating function using the seed and n,
   wherein the map assigns a unique combination of the multiple encryption keys to each encrypted file portion,
   wherein the program code is further executable by the at least one hardware processor to
   encrypt the plaintext tag multiple times according to the map by, for each encrypted file portion, encrypt using a symmetric encryption algorithm and the assigned unique combination of the encryption keys,
   store each encrypted portion separately by storing each encrypted portion in association with a different storage location string, and
   separately index each stored encrypted portion by storing the associated ciphertext with an encrypted storage location string derived by encrypting the storage location string of the stored encrypted portion using the symmetric encryption algorithm with the unique combination of the encryption keys assigned by the map,
   wherein deriving each encrypted search query comprises encrypting the search query using the symmetric encryption algorithm and one of the unique combinations of the encryption keys assigned by the map, and
   wherein retrieving the at least some of the multiple encrypted portions comprises, for each encrypted search query, retrieving the encrypted locator string stored with the ciphertext matching the encrypted search query, decrypting the encrypted locator string using the unique combination of the encryption keys used to derive the encrypted search query, and retrieving the encrypted file portion using the decrypted locator string.

2. The system of claim 1, wherein the multiple unique combinations of the multiple encryption keys are determined according to the prime factors of the number of the stored encrypted portions, (n), of the electronic file, wherein the prime factors comprise the dimensions of the map, and wherein the number of the multiple encryption keys corresponds to the sum of the prime factors.

3. The system of claim 1, wherein the number of multiple encryption keys is n, and wherein each unique combination of the multiple encryption keys comprises a different one of the n encryption keys, thereby associating each encrypted portion with a different one of the encryption keys.

4. A method for providing access to an electronic file, comprising using at least one hardware processor for:
   receiving an electronic file in association with a plain text tag;
   creating multiple (n) encrypted portions of the electronic file;
   storing each encrypted portion separately;
   deriving multiple (n) differently encrypted ciphertexts by applying cipher information to encrypt the plaintext tag multiple times according to a map of the encrypted file portions, wherein the map is based on the cipher information;
   associating each encrypted portion with the different one of the ciphertexts; and
   separately indexing each stored encrypted portion with the associated ciphertext,
   wherein the cipher information comprises a seed and n,
   wherein applying the cipher information comprises generating multiple encryption keys from a key generating function using the seed and n,
   wherein the map assigns a unique combination of the multiple encryption keys to each encrypted portion,
   wherein encrypting the plaintext tag multiple times according to the map comprises, for each encrypted file portion, using a symmetric encryption algorithm and the assigned unique combination of the encryption keys,
   wherein storing each encrypted portion separately comprises storing each encrypted portion in association with a different storage location string, and
   wherein separately indexing each stored encrypted portion comprises storing the associated ciphertext with an encrypted storage location string derived by encrypting the storage location string of the stored encrypted portion using the symmetric encryption algorithm with the unique combination of the encryption keys assigned by the map.

5. The method of claim 4, wherein the number of multiple encryption keys is any one of:
   n, wherein each unique combination of the multiple encryption keys comprises a different one of the n encryption keys, thereby associating each encrypted portion with a different one of the encryption keys, and
   the sum of the prime factors of n, wherein the prime factors comprise the dimensions of the map and determine the multiple unique combinations of the multiple encryption keys.

6. A method for retrieving an electronic file, comprising using at least one hardware processor for:
   receiving cipher information;
   receiving a search query that matches a plaintext tag associated with an electronic file, wherein the electronic file is stored as multiple (n) encrypted portions, each indexed by a differently encrypted ciphertext derived from the plaintext tag;
   deriving multiple encrypted search queries matching at least some of the n ciphertexts by applying the cipher information to encrypt the search query multiple times according to a map of the encrypted file portions, wherein the map is based on the cipher information and associates each encrypted portion with the different one of the ciphertexts;
   querying using the multiple encrypted search queries;
   retrieving at least some of the n encrypted portions; and
   recovering the electronic file from the retrieved encrypted portions,
   wherein the cipher information comprises a seed and n,
   wherein applying the cipher information comprises generating multiple encryption keys from a key generating function using the seed and n,
   wherein the map assigns multiple unique combinations of the multiple encryption keys to the n encrypted file portions,
   wherein encrypting the search query multiple times according to the map comprises encrypting the search query using the symmetric encryption algorithm and one of the unique combinations of the encryption keys assigned by the map, and
   wherein retrieving the at least some of the n multiple encrypted portions of the electronic file comprises, for each encrypted search query, retrieving an encrypted locator string stored with the ciphertext matching the encrypted search query, decrypting the encrypted locator string using the unique combination of the encryption keys used to derive the encrypted search query, and retrieving the encrypted file portion using the decrypted locator string.

7. The method of claim 6, wherein the number of multiple encryption keys is any one of:
   n, wherein each unique combination of the multiple encryption keys comprises a different one of the n encryption keys, thereby associating each encrypted portion with a different one of the encryption keys, and
   the sum of the prime factors of n, wherein the prime factors comprise the dimensions of the map and determine the multiple unique combinations of the multiple encryption keys.

* * * * *